(12) United States Patent
Yamamoto et al.

(10) Patent No.: US 10,232,851 B2
(45) Date of Patent: Mar. 19, 2019

(54) TRAVEL TRACK CREATION DEVICE, METHOD, AND PROGRAM, AND DRIVING ASSISTANCE DEVICE AND SYSTEM

(71) Applicant: SANEI CO., LTD., Hiroshima (JP)

(72) Inventors: Makoto Yamamoto, Hiroshima (JP); Shintaro Osaki, Aichi (JP); Tetsuji Yanagisawa, Aichi (JP)

(73) Assignee: SANEI CO., LTD., Hiroshima (JP)

( * ) Notice: Subject to any disclaimer, the term of this patent is extended or adjusted under 35 U.S.C. 154(b) by 0 days.

(21) Appl. No.: 15/737,271

(22) PCT Filed: Aug. 10, 2016

(86) PCT No.: PCT/JP2016/073641
§ 371 (c)(1),
(2) Date: Dec. 15, 2017

(87) PCT Pub. No.: WO2017/033752
PCT Pub. Date: Mar. 2, 2017

(65) Prior Publication Data
US 2018/0170376 A1 Jun. 21, 2018

(30) Foreign Application Priority Data
Aug. 26, 2015 (JP) .................................. 2015-167240

(51) Int. Cl.
*B62D 6/00* (2006.01)
*G08G 1/00* (2006.01)
(Continued)

(52) U.S. Cl.
CPC ............ *B60W 30/10* (2013.01); *B60W 10/20* (2013.01); *B60W 40/072* (2013.01);
(Continued)

(58) Field of Classification Search
CPC .. B60W 30/10; B60W 50/14; B60W 2710/20; B62D 6/002; G01C 21/26
See application file for complete search history.

(56) References Cited

U.S. PATENT DOCUMENTS 6,711,480 B2 3/2004 Yamamoto et al.
2003/0065429 A1 4/2003 Yamamoto et al.
(Continued)

FOREIGN PATENT DOCUMENTS

JP 2003-337993 A 11/2003
JP 2004-294953 A 10/2004
(Continued)

OTHER PUBLICATIONS

International Search Report for PCT/JP2016/073641 dated Oct. 25, 2016.
(Continued)

*Primary Examiner* — Aaron L Troost
(74) *Attorney, Agent, or Firm* — Womble Bond Dickinson (US) LLP; Joseph Bach, Esq.

(57) ABSTRACT

A driving assistance device that performs steering operation of a vehicle. The device includes a travel track creation device having a curvature waveform creator that creates a waveform representing a curvature of a reference travel track. A first changer changes first and second edge portions of the waveform to a ramp shape and provides the waveform with first and second ramp-shaped portions. A second changer changes each of the first and second ramp-shaped portions to a curve and provides the waveform with first, second, third, and fourth curve portions. A travel track creator creates the travel track based on the waveform. A controller provides a steering signal according to the travel track.

13 Claims, 23 Drawing Sheets

(51) Int. Cl.
  *B60W 10/20* (2006.01)
  *B60W 30/10* (2006.01)
  *B60W 50/14* (2012.01)
  *G01C 21/26* (2006.01)
  *B60W 40/072* (2012.01)

(52) U.S. Cl.
  CPC ............... *B60W 50/14* (2013.01); *B62D 6/00* (2013.01); *B62D 6/002* (2013.01); *G01C 21/26* (2013.01); *G08G 1/00* (2013.01); *B60W 2050/146* (2013.01); *B60W 2520/06* (2013.01); *B60W 2550/146* (2013.01); *B60W 2550/402* (2013.01); *B60W 2710/20* (2013.01)

(56) References Cited

U.S. PATENT DOCUMENTS

2006/0020389 A1* 1/2006 Yamamoto ............ G01C 21/26
  701/494
2006/0287817 A1* 12/2006 Nagel .................... B60W 30/09
  701/507
2009/0187322 A1* 7/2009 Yasui .................... B60W 10/06
  701/70
2015/0354968 A1 12/2015 Mizuno et al.
2016/0288785 A1* 10/2016 Ezoe ............... B60W 30/18145

FOREIGN PATENT DOCUMENTS

| | | |
|---|---|---|
| JP | 4125569 B2 | 7/2008 |
| JP | 2012-066778 A | 4/2012 |
| JP | 2014-142235 A | 8/2014 |
| JP | 2015-074425 A | 4/2015 |
| JP | 5749359 B2 | 7/2015 |

OTHER PUBLICATIONS

Extended Search Report for European Patent Application No. 16839099.5 dated Oct. 9, 2018.

* cited by examiner

FIG.10
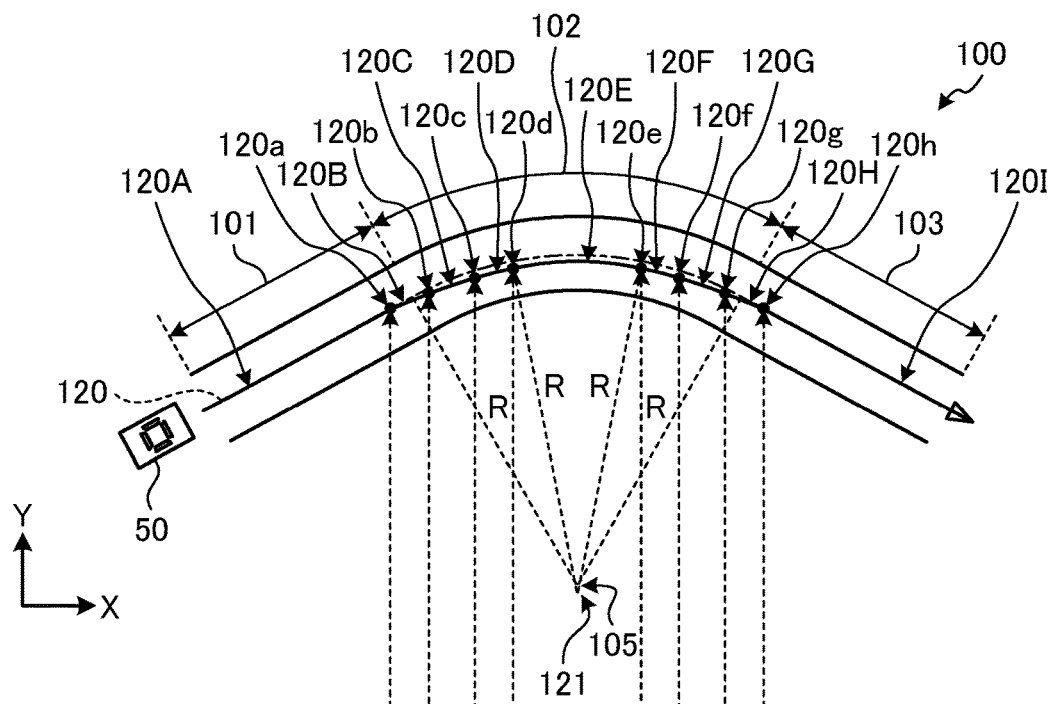
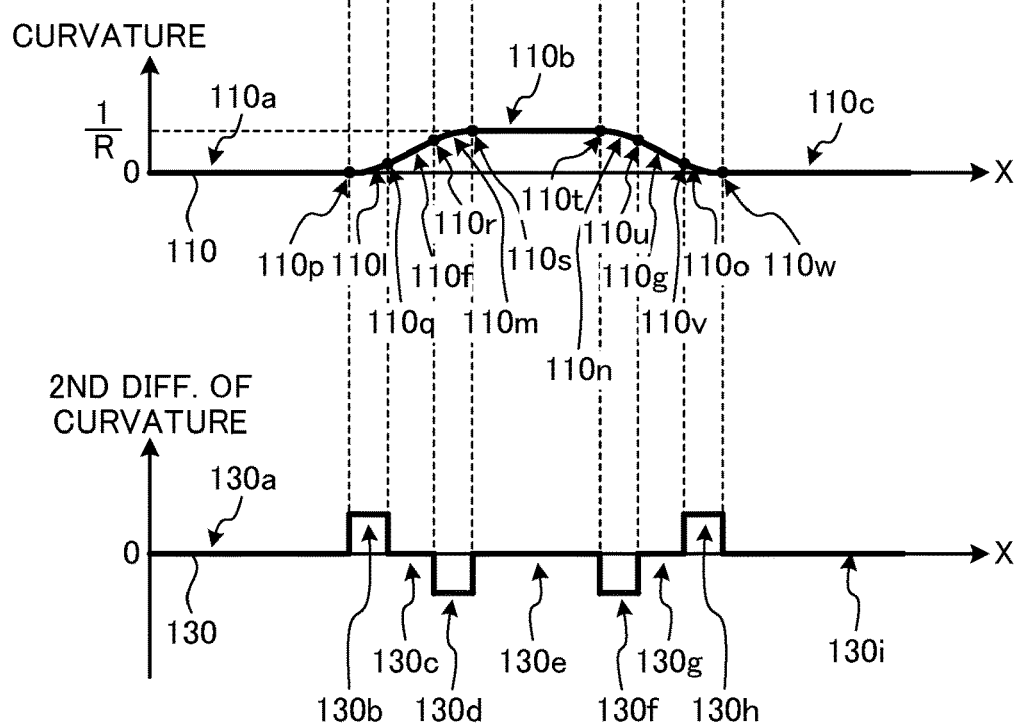

TRAVEL TRACK CREATION DEVICE, METHOD, AND PROGRAM, AND DRIVING ASSISTANCE DEVICE AND SYSTEM

RELATED APPLICATIONS

The present application is the national phase of International Application No. PCT/JP2016/073641, filed on Aug. 10, 2016, which claims priority to and the benefit of Japanese Patent Application No. 2015-167240, filed on Aug. 26, 2015, and the disclosures of which are hereby incorporated herein by reference in their entireties.

TECHNICAL FIELD

The present invention relates to a travel track creation device, a travel track creation method, and a travel track creation program for creating a travel track on which a vehicle travels on a road, and a driving assistance device and a driving assistance system.

BACKGROUND ART

A curve of a road such as an expressway or a main highway includes an inlet straight portion that is an inlet of the curve, an inlet clothoid portion continuous to the inlet straight portion, an arc portion continuous to the inlet clothoid portion, an outlet clothoid portion continuous to the arc portion, and an outlet straight portion continuous to the outlet clothoid portion. Such a configuration of the road enables a vehicle to travel smoothly at high speed so that side-slip of the vehicle can be reduced and uncomfort of a passenger can be reduced.

On the other hand, an intersection in an urban distinct, for example, includes only an inlet straight portion, an arc portion continuous to the inlet straight portion, and an outlet straight portion continuous to the arc portion and does not include an inlet clothoid portion and an outlet clothoid portion in some cases.

FIG. 23 is a plan view illustrating an example of an intersection. This intersection 200 is a crossroad where four roads meet. In a case where a vehicle 300 enters the intersection 200 along an arrow 201 from the left in the drawing and travels out of the intersection 200 along an arrow 202 upward in the drawing, the vehicle 300 passes through an inlet straight portion 203, an arc portion 204 continuous to the inlet straight portion 203, and an outlet straight portion 205 continuous to the arc portion 204.

As a relevant technique, Patent Document 1 listed below describes a driving assistance system that creates a virtual digital travel track using a line, an arc, a clothoid curve, and so forth based on a road parameter and positional information on a vehicle.

Patent Document 2 listed below describes a road map creation device that detects coordinates of a current location of a mobile object at each predetermined time and, based on a group of detected coordinates, creates a map of roads constituted by straight portions, non-straight portions continuous to the straight portions, and straight portions continuous to the non-straight portions.

CITATION LIST

Patent Documents

PATENT DOCUMENT 1: Japanese Patent No. 4125569
PATENT DOCUMENT 2: Japanese Patent No. 5749359

SUMMARY OF THE INVENTION

Technical Problem

In a case where a road is constituted only by an inlet straight portion, an arc portion continuous to the inlet straight portion, and an outlet straight portion continuous to the arc portion, when a vehicle travels along the road, the vehicle cannot travel smoothly at a connection point between the inlet straight portion and the arc portion and a connection point between the arc portion and the outlet straight portion, resulting in an increased possibility of side-slip of the vehicle and increased uncomfort of a passenger.

In particular, a vehicle equipped with a driving assistance device that assists a steering operation of a driver or performs the steering operation for the driver assists or performs the steering operation so that the vehicle travels along the road, resulting in an increased possibility of side-slip of the vehicle and increased uncomfort of a passenger.

Intersections each constituted only by an inlet straight portion, an arc portion continuous to the inlet straight portion, and an outlet straight portion continuous to the arc portion are present at about 200,000 locations with signals and at about 800,000 locations without signals. Thus, it is highly required to reduce side-slip of vehicles with reduction of uncomfort of passengers.

The present invention has been made in view of the foregoing situations, and has an object of providing a travel track creation device, a travel track creation method, and a travel track creation program that can create a travel track on which a vehicle can travel smoothly and a driving assistance device and a driving assistance system.

Solution to the Problem

To solve the problems described above and obtain the object, a travel track creation device according to a first aspect of the present invention is a travel track creation device that creates a travel track on which a vehicle travels on a road and which includes an inlet straight portion, an arc portion continuous to the inlet straight portion, and an outlet straight portion continuous to the arc portion, and the travel track creation device includes: a curvature waveform creator that creates a waveform representing a curvature of a reference travel track that is a track on which the vehicle travels along the road and includes an inlet straight track, an arc track continuous to the inlet straight track, and an outlet straight track continuous to the arc track; a first changer that changes each of a first edge portion and a second edge portion to a ramp shape and provides the waveform with a first ramp-shaped portion and a second ramp-shaped portion, the first edge portion and the second edge portion being two edges of the waveform; a second changer that changes each end of each of the first ramp-shaped portion and the second ramp-shaped portion to a curve and provides the waveform with a first curve portion, a second curve portion, a third curve portion, and a fourth curve portion; and a travel track creator that creates the travel track based on the waveform.

In the travel track creation device according to the first aspect of the present invention, the first curve portion, the second curve portion, the third curve portion, and the fourth curve portion may be quadric curves.

In the travel track creation device according to the first aspect of the present invention, the first curve portion, the second curve portion, the third curve portion, and the fourth curve portion may be hyperbolic tangent function curves or sigmoid function curves.

In the travel track creation device according to the first aspect of the present invention, the second changer may directly couple the first curve portion and the second curve portion to each other, and directly couple the third curve portion and the fourth curve portion to each other.

In the travel track creation device according to the first aspect of the present invention, the first changer may provide the first ramp-shaped portion and the second ramp-shaped portion in such a manner that intermediate points of the first ramp-shaped portion and the second ramp-shaped portion overlap with the first edge portion and the second edge portion, respectively.

A driving assistance device according to a first aspect of the present invention includes: the travel track creation device according to the first aspect of the present invention; a display that displays an image; and a travel track displayer that causes the display to display the travel track.

A driving assistance device according to a second aspect of the present invention includes: the travel track creation device according to the first aspect of the present invention; an actuator that causes a steering column of the vehicle to rotate; and an actuator controller that operates the actuator to thereby cause the steering column to rotate so that the vehicle travels on the travel track.

The travel track creation device according to the first aspect of the present invention may further include a recording medium writer that writes the travel track on a recording medium.

A driving assistance device according to a third aspect of the present invention includes: a recording medium reader that reads the travel track recorded on the recording medium by the travel track creation device; a display that displays an image; and a travel track displayer that causes the display to display the travel track.

A driving assistance device according to a fourth aspect of the present invention includes: a recording medium reader that reads the travel track recorded on the recording medium by the travel track creation device; an actuator that causes a steering column of the vehicle to rotate; and an actuator controller that operates the actuator to thereby cause the steering column to rotate so that the vehicle travels on the travel track.

A driving assistance system according to a first aspect of the present invention is a driving assistance system including a driving assistance device mounted on a vehicle, and a travel track creation device configured to communicate with the driving assistance device, the travel track creation device includes a current location receiver that receives a current location of the vehicle from the driving assistance device, a curvature waveform creator that creates a waveform representing a curvature of a reference travel track that is a track on which the vehicle travels along the road and includes an inlet straight track, an arc track continuous to the inlet straight track, and an outlet straight track continuous to the arc track, a first changer that changes each of a first edge portion and a second edge portion to a ramp shape and provides the waveform with a first ramp-shaped portion and a second ramp-shaped portion, the first edge portion and the second edge portion being two edges of the waveform, a second changer that changes each end of each of the first ramp-shaped portion and the second ramp-shaped portion to a curve and provides the waveform with a first curve portion, a second curve portion, a third curve portion, and a fourth curve portion, a travel track creator that creates a travel track based on the waveform, and a travel track transmitter that transmits the travel track to the driving assistance device, and the driving assistance device includes a display that displays an image, a travel track receiver that receives the travel track from the travel track creation device, and a travel track displayer that causes the display to display the travel track.

A driving assistance system according to a second aspect of the present invention is a driving assistance system including a driving assistance device mounted on a vehicle, and a travel track creation device configured to communicate with the driving assistance device, the travel track creation device includes a current location receiver that receives a current location of the vehicle from the driving assistance device, a curvature waveform creator that creates a waveform representing a curvature of a reference travel track that is a track on which the vehicle travels along the road and includes an inlet straight track, an arc track continuous to the inlet straight track, and an outlet straight track continuous to the arc track, a first changer that changes each of a first edge portion and a second edge portion to a ramp shape and provides the waveform with a first ramp-shaped portion and a second ramp-shaped portion, the first edge portion and the second edge portion being two edges of the waveform, a second changer that changes each end of each of the first ramp-shaped portion and the second ramp-shaped portion to a curve and provides the waveform with a first curve portion, a second curve portion, a third curve portion, and a fourth curve portion, a travel track creator that creates a travel track based on the waveform, and a travel track transmitter that transmits the travel track to the driving assistance device, and the driving assistance device includes an actuator that causes a steering column of the vehicle to rotate; and an actuator controller that operates the actuator to thereby cause the steering column to rotate so that the vehicle travels on the travel track.

A travel track creation method according to an aspect of the present invention is a travel track creation method for creating a travel track on which a vehicle travels on a road and which includes an inlet straight portion, an arc portion continuous to the inlet straight portion, and an outlet straight portion continuous to the arc portion, and the method includes: a curvature waveform creation step of creating a waveform representing a curvature of a reference travel track that is a track on which the vehicle travels along the road and includes an inlet straight track, an arc track continuous to the inlet straight track, and an outlet straight track continuous to the arc track; a first change step of changing each of a first edge portion and a second edge portion to a ramp shape and providing the waveform with a first ramp-shaped portion and a second ramp-shaped portion, the first edge portion and the second edge portion being two edges of the waveform; a second change step of changing each end of each of the first ramp-shaped portion and the second ramp-shaped portion to a curve and providing the waveform with a first curve portion, a second curve portion, a third curve portion, and a fourth curve portion; and a travel track creation step of creating the travel track based on the waveform.

A travel track creation program according to an aspect of the present invention is a travel track creation program to be executed by a computer in order to create a travel track on which a vehicle travels on a road and which includes an inlet straight portion, an arc portion continuous to the inlet straight portion, and an outlet straight portion continuous to the arc portion, and the travel track creation program includes: a curvature waveform creation step of creating a waveform representing a curvature of a reference travel track that is a track on which the vehicle travels along the road and includes an inlet straight track, an arc track continuous to the inlet straight track, and an outlet straight track continuous to the arc track; a first change step of changing each of a first edge portion and a second edge portion to a ramp shape and providing the waveform with a first ramp-shaped portion and a second ramp-shaped portion, the first edge portion and the second edge portion being two edges of the waveform; a second change step of changing each end of each of the first ramp-shaped portion and the second ramp-shaped portion to a curve and providing the waveform with a first curve portion, a second curve portion, a third curve portion, and a fourth curve portion; and a travel track creation step of creating the travel track based on the waveform.

Advantages of the Invention

According to some aspects of the present invention, a travel track on which a vehicle can travel smoothly can be created advantageously.

BRIEF DESCRIPTION OF THE DRAWINGS

FIG. 10 is a view illustrating a waveform of second-order differentiation of a curvature of a travel track according to the first embodiment.

DESCRIPTION OF EMBODIMENTS

A travel track creation device, a travel track creation method, a travel track creation program, a driving assistance device, and a driving assistance system according to embodiments of the present invention will be described in detail with reference to the drawings. These embodiments are not intended to limit the invention.

First Embodiment

Figure 1:
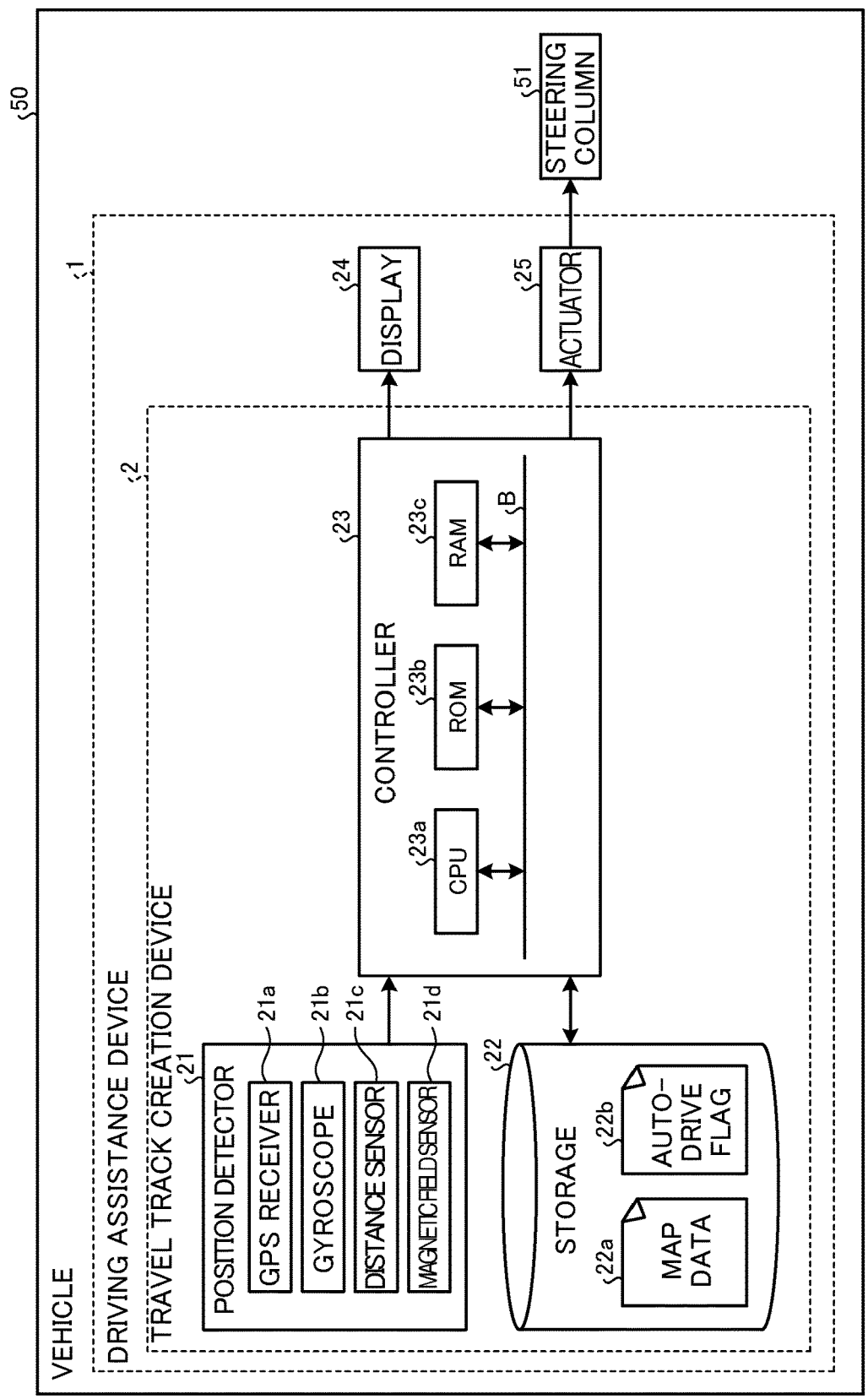
FIG. 1 is a view illustrating a configuration of a driving assistance device according to a first embodiment.

FIG. 1 is a view illustrating a configuration of a driving assistance device according to a first embodiment. This driving assistance device 1 is mounted on a vehicle 50.

The driving assistance device 1 includes a travel track creation device 2, a display 24, and an actuator 25. The travel track creation device 2 includes a position detector 21, a storage 22, and a controller 23.

The position detector 21 includes a GPS receiver 21a, a gyroscope 21b, a distance sensor 21c, and a magnetic field sensor 21d.

The GPS receiver 21a receives electric waves from an artificial satellite for a global positioning system (GPS), detects the position, orientation (traveling direction), velocity, and acceleration, for example, of the vehicle 50, and outputs detected results to the controller 23.

The gyroscope 21b is a sensor for detecting an angular velocity (orientation change amount) of the vehicle 50, and outputs a detection signal in accordance with an angular velocity of rotation movement applied to the vehicle 50, to the controller 23.

Based on the acceleration in the longitudinal direction of the vehicle 50, for example, the distance sensor 21c detects a distance of travel of the vehicle 50 and outputs the distance to the controller 23.

The magnetic field sensor 21d is an orientation sensor using a semiconductor, and outputs the detected orientation to the controller 23 based on north and south geomagnetisms generated on the earth.

The storage 22 stores map data 22a and an auto-drive flag 22b. Examples of the storage 22 include a solid state drive (SSD) and a hard disk drive (HDD).

The map data 22a includes map data on a curve or an intersection including only an inlet straight portion, an arc portion continuous to the inlet straight portion, and an outlet straight portion continuous to the arc portion, and including none of an inlet clothoid portion and an outlet clothoid portion.

As the auto-drive flag 22b, "1" is set beforehand in a case where the driving assistance device 1 performs automatic operation of the vehicle 50, whereas "0" is set beforehand in a case where the driving assistance device 1 does not performs an automatic operation of the vehicle 50.

The controller 23 includes a central processing unit (CPU) 23a, a read only memory (ROM) 23b, and a random access memory (RAM) 23c. The CPU 23a, the ROM 23b, and the RAM 23c are connected together through a bus B.

The CPU 23a executes a program stored in the ROM 23b while using the RAM 23c as a work area. The program may be stored in the storage 22.

Based on data output from the controller 23, the display 24 displays a map an image of a travel track on which the vehicle 50 travels. Examples of the display 24 include a liquid crystal display device and an organic electro luminescence (EL) display device.

The actuator 25 is connected to a steering column 51 of the vehicle 50. In a case where the driving assistance device 1 performs an automatic operation, the actuator 25 rotates the steering column 51 based on a control signal output from the controller 23. In this manner, the orientation (traveling direction) of the vehicle 50 changes. Examples of the actuator 25 include a motor and a hydraulic pump.

Figure 2:
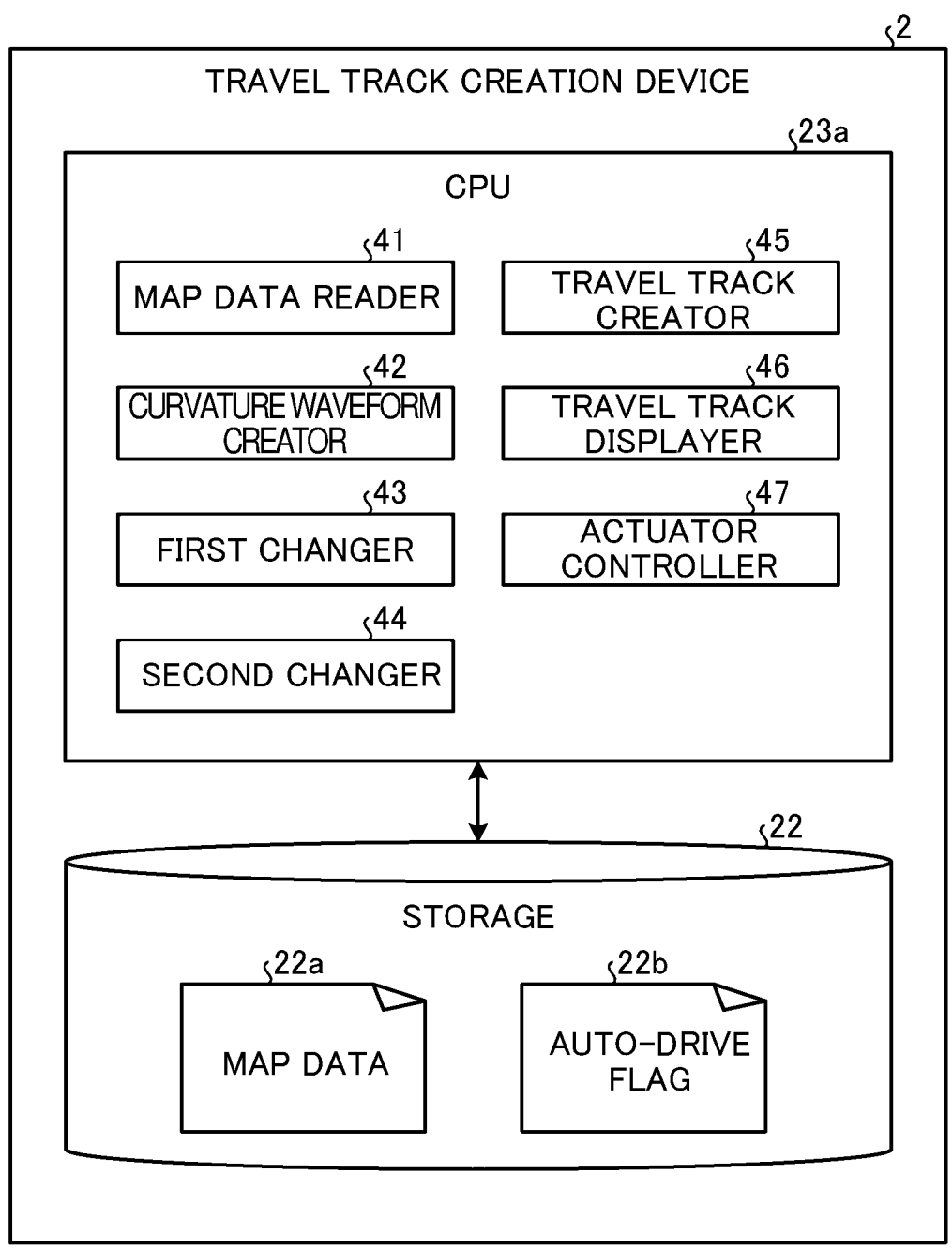
FIG. 2 is a view illustrating functional blocks of a travel track creation device according to the first embodiment.

FIG. 2 is a view illustrating functional blocks of the travel track creation device according to the first embodiment. The CPU 23a executes a program stored in the ROM 23b. In this manner, a map data reader 41, a curvature waveform creator 42, a first changer 43, a second changer 44, a travel track creator 45, a travel track displayer 46, and an actuator controller 47 are implemented.

The map data reader 41 reads map data 22a from the storage 22.

The curvature waveform creator 42 creates a waveform representing a curvature of a reference travel track that is a track on which the vehicle 50 travels along a road and includes an inlet straight track, an arc track continuous to the inlet straight track, and an outlet straight track continuous to the arc track.

The first changer 43 changes, to a ramp shape, each of a first edge portion and a second edge portion that are two edges of the waveform, and provides the waveform with a first ramp-shaped portion and a second ramp-shaped portion.

The second changer 44 changes each end of each of the first ramp-shaped portion and the second ramp-shaped portion to a curve and provides the waveform with a first curve portion, a second curve portion, a third curve portion, and a fourth curve portion.

Based on the waveform, the travel track creator 45 creates a travel track.

The travel track displayer 46 causes the display 24 to display the travel track.

The actuator controller 47 operates the actuator 25 to thereby cause the steering column 51 to rotate so that the vehicle 50 travels on the travel track.

Figure 3:
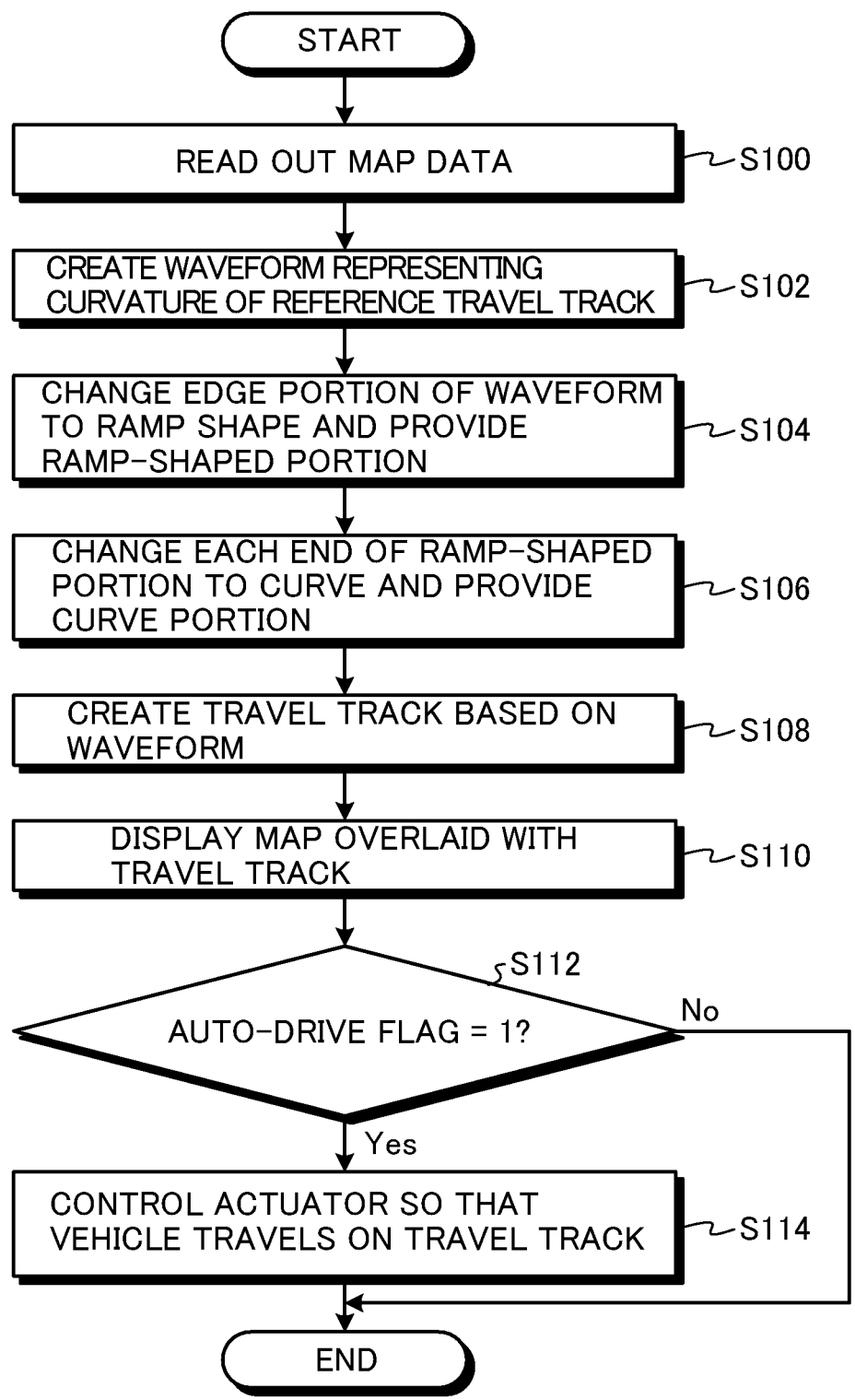
FIG. 3 is a flowchart depicting processes of the driving assistance device according to the first embodiment.

FIG. 3 is a flowchart depicting processes of the driving assistance device according to the first embodiment. The driving assistance device 1 starts the processes illustrated in FIG. 3 when the distance between the vehicle 50 and a curve or an intersection reaches a predetermined distance.

At step S100, the map data reader 41 reads map data 22a from the storage 22.

Figure 4:
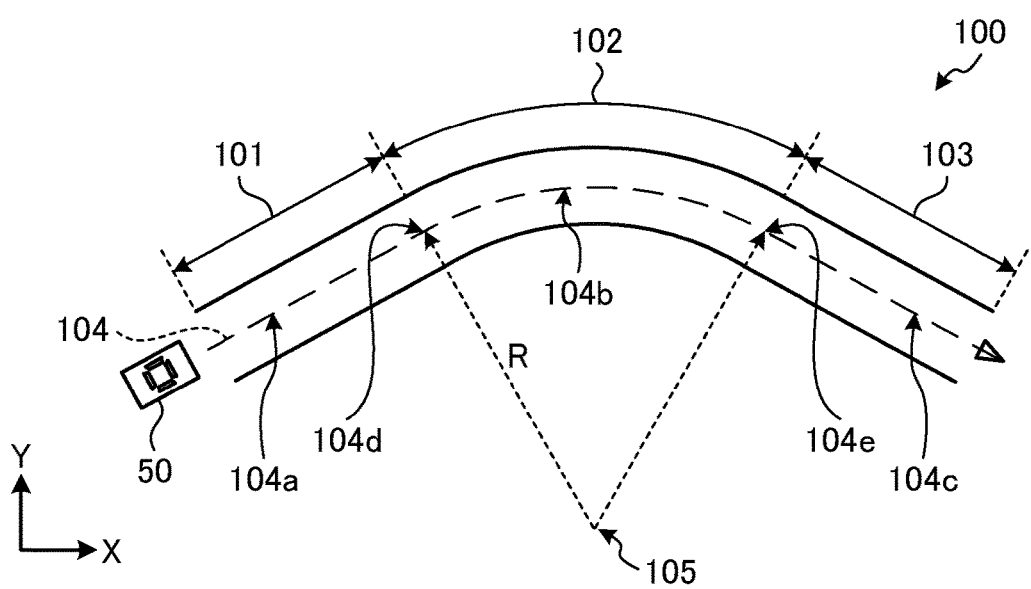
FIG. 4 is a plan view illustrating an example of a road included in a map represented by map data according to the first embodiment.

FIG. 4 is a plan view illustrating an example of a road included in a map represented by map data according to the first embodiment. In FIG. 4, the abscissa represents an X-axis direction, and the ordinate represents a Y-axis direction. This road 100 includes an inlet straight portion 101, an arc portion 102 continuous to the inlet straight portion 101, and an outlet straight portion 103 continuous to the arc portion 102. In FIG. 4, only one lane is shown, and an opposing lane is not shown.

The map data 22a contains a reference travel track 104. The reference travel track 104 is a track on which the vehicle 50 travels along the road 100, and is exemplified by a center line of the road 100.

The reference travel track 104 includes an inlet straight track 104a in the inlet straight portion 101, includes an arc track 104b continuous to the inlet straight track 104a in the arc portion 102, and includes an outlet straight track 104c continuous to the arc track 104b in the outlet straight portion 103. The arc track 104b is an arc having a radius R about a point 105.

The inlet straight track 104a and the arc track 104b are connected to each other at a point 104d at the boundary between the inlet straight portion 101 and the arc portion 102. The arc track 104b and the outlet straight track 104c are connected to each other at a point 104e at the boundary between the arc portion 102 and the outlet straight portion 103.

With reference to FIG. 3 again, the curvature waveform creator 42 creates a waveform representing a curvature of the reference travel track 104 in step S102.

Figure 5:
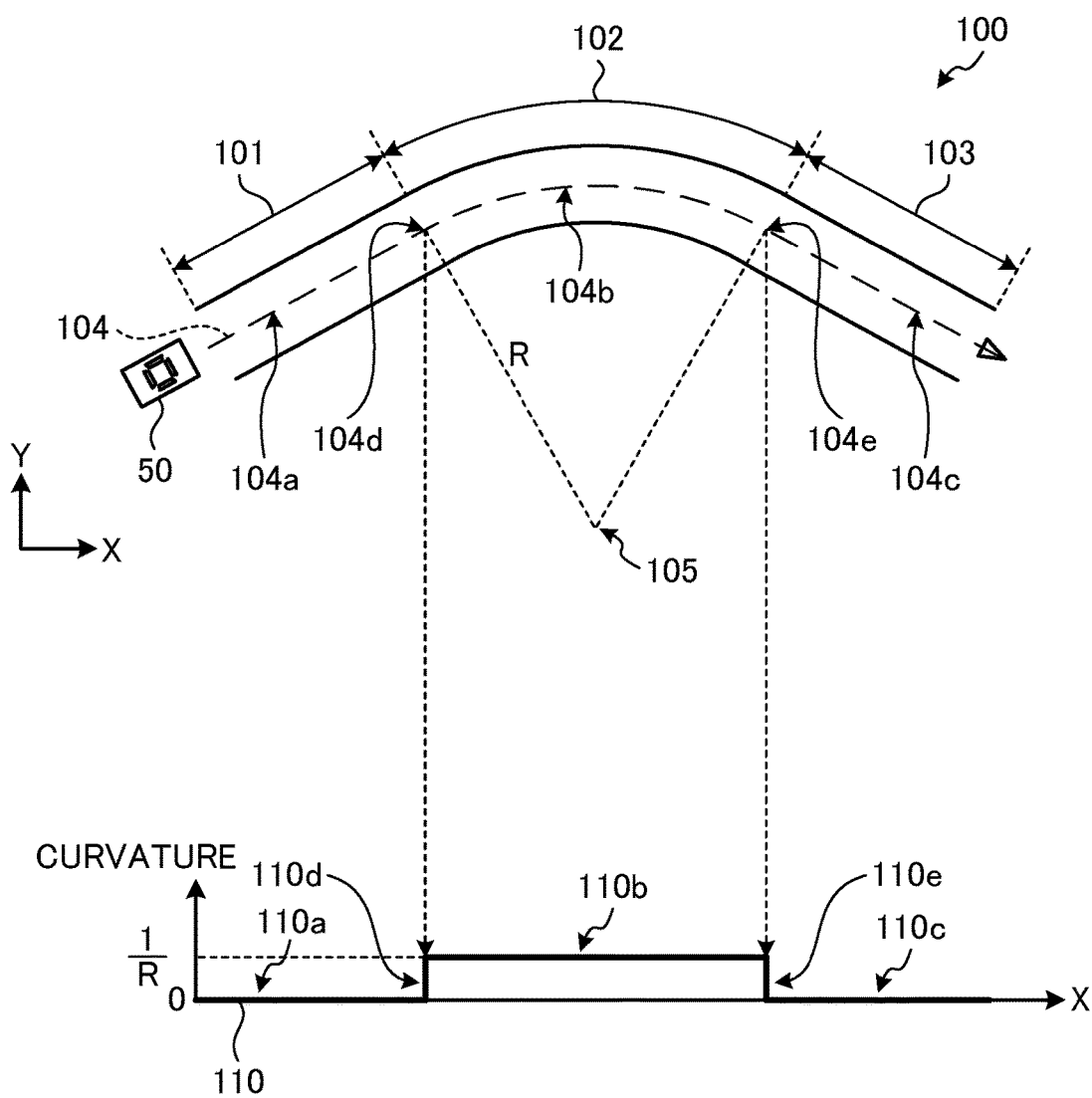
FIG. 5 is a view illustrating an example of a waveform representing a curvature of the road according to the first embodiment.

FIG. 5 is a view illustrating an example of the waveform representing the curvature of the road according to the first embodiment. In FIG. 5, the abscissa represents an X-axis direction, and the ordinate represents a curvature. The curvature in the inlet straight track 104a is 0 (zero). The curvature in the arc track 104b is 1/R. The curvature in the outlet straight track 104c is 0 (zero).

Thus, the curvature waveform creator 42 creates a waveform 110 including a first portion 110a corresponding to the inlet straight track 104a and having a curvature of 0 (zero), a second portion 110b corresponding to the arc track 104b and having a curvature of 1/R, and a third portion 110c corresponding to the outlet straight track 104c and having a curvature of 0 (zero).

The waveform 110 only needs to be created in the RAM 23c, and does not need to be displayed by the display 24.

A portion between the first portion 110a and the second portion 110b serves as a first edge portion 110d, and a portion between the second portion 110b and the third portion 110c serves as a second edge portion 110e.

In a case where the vehicle 50 travels on the reference travel track 104, the vehicle 50 is steeply steered at the point 104d and the point 104e.

A lateral acceleration (acceleration in the lateral direction) of the vehicle 50 is proportional to the curvature. The lateral direction refers to a direction orthogonal to the traveling direction of the vehicle 50. That is, the waveform 110 representing the curvature of the reference travel track 104 is also a waveform representing the lateral acceleration of the vehicle 50 traveling on the reference travel track 104. Thus, in the first edge portion 110d and the second edge portion 110e, the lateral acceleration of the vehicle 50 rapidly changes, resulting in an increased possibility of side-slip of the vehicle 50 and increased uncomfort of a passenger.

With reference to FIG. 3 again, in step S104, the first changer 43 changes the first edge portion 110d and the second edge portion 110e of the waveform 110 to ramp shapes, thereby providing a first ramp-shaped portion 110f and a second ramp-shaped portion 110g.

Figure 6:
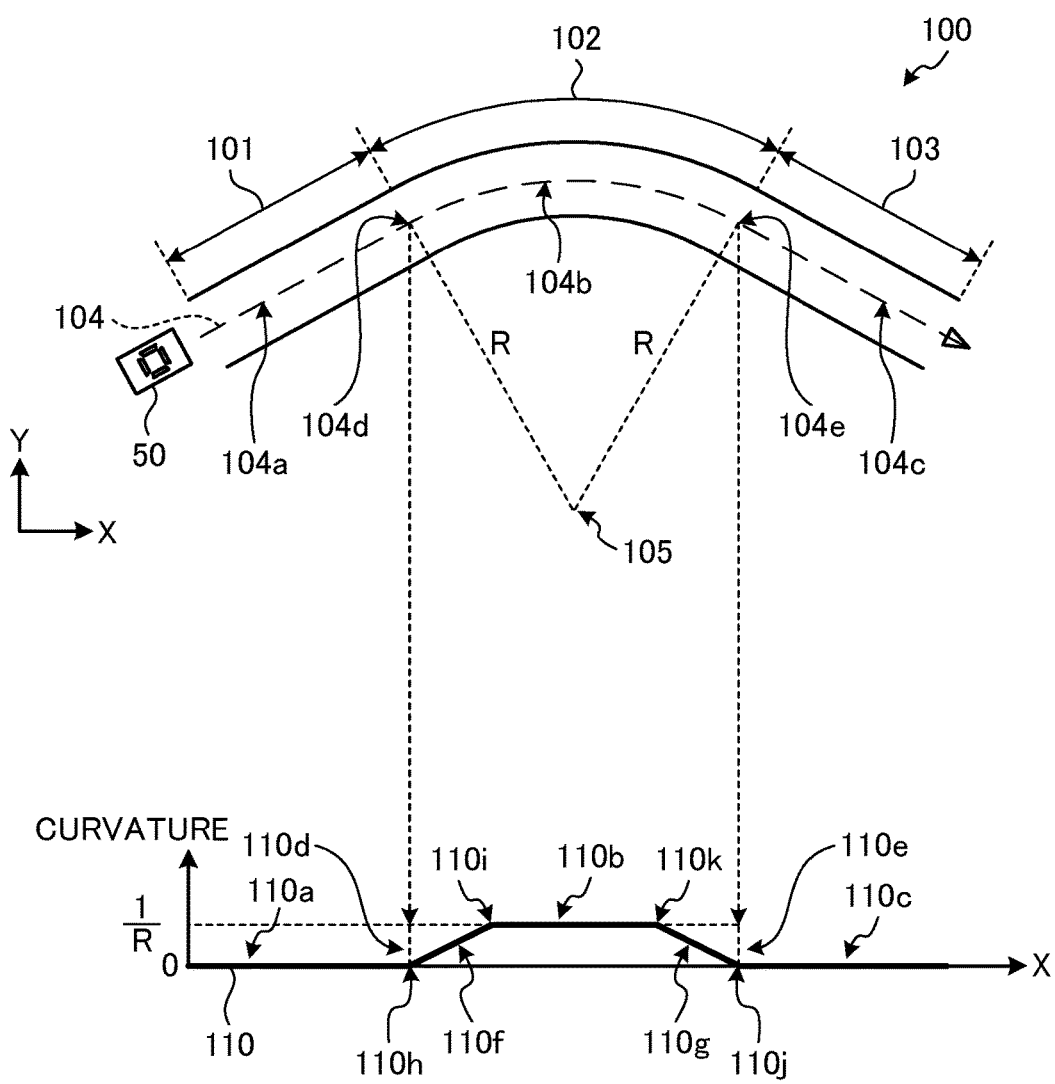
FIG. 6 is a view illustrating an example of a waveform created by the driving assistance device according to the first embodiment.

FIG. 6 is a view illustrating an example of a waveform created by the driving assistance device according to the first embodiment. The first changer 43 changes the first edge portion 110*d* of the waveform 110 to a ramp shape, thereby providing the first ramp-shaped portion 110*f*. In the first embodiment, the first changer 43 provides the first ramp-shaped portion 110*f* having a start point 110*h* that is a lower end of the first edge portion 110*d*. Thus, an end point 110*i* of the first ramp-shaped portion 110*f* is located forward of the first edge portion 110*d* in the traveling direction.

The first changer 43 changes the second edge portion 110*e* of the waveform 110 to a ramp shape, thereby providing the second ramp-shaped portion 110*g*. In the first embodiment, the first changer 43 provides the second ramp-shaped portion 110*g* having an end point 110*j* that is a lower end of the second edge portion 110*e*. Thus, a start point 110*k* of the second ramp-shaped portion 110*g* is located rearward of the second edge portion 110*e* in the traveling direction.

With reference to FIG. 3 again, in step S106, the second changer 44 changes each end of each of the first ramp-shaped portion 110*f* and the second ramp-shaped portion 110*g* to a curve, thereby providing a first curve portion 110*l*, a second curve portion 110*m*, a third curve portion 110*n*, and a fourth curve portion 110*o*.

Figure 7:
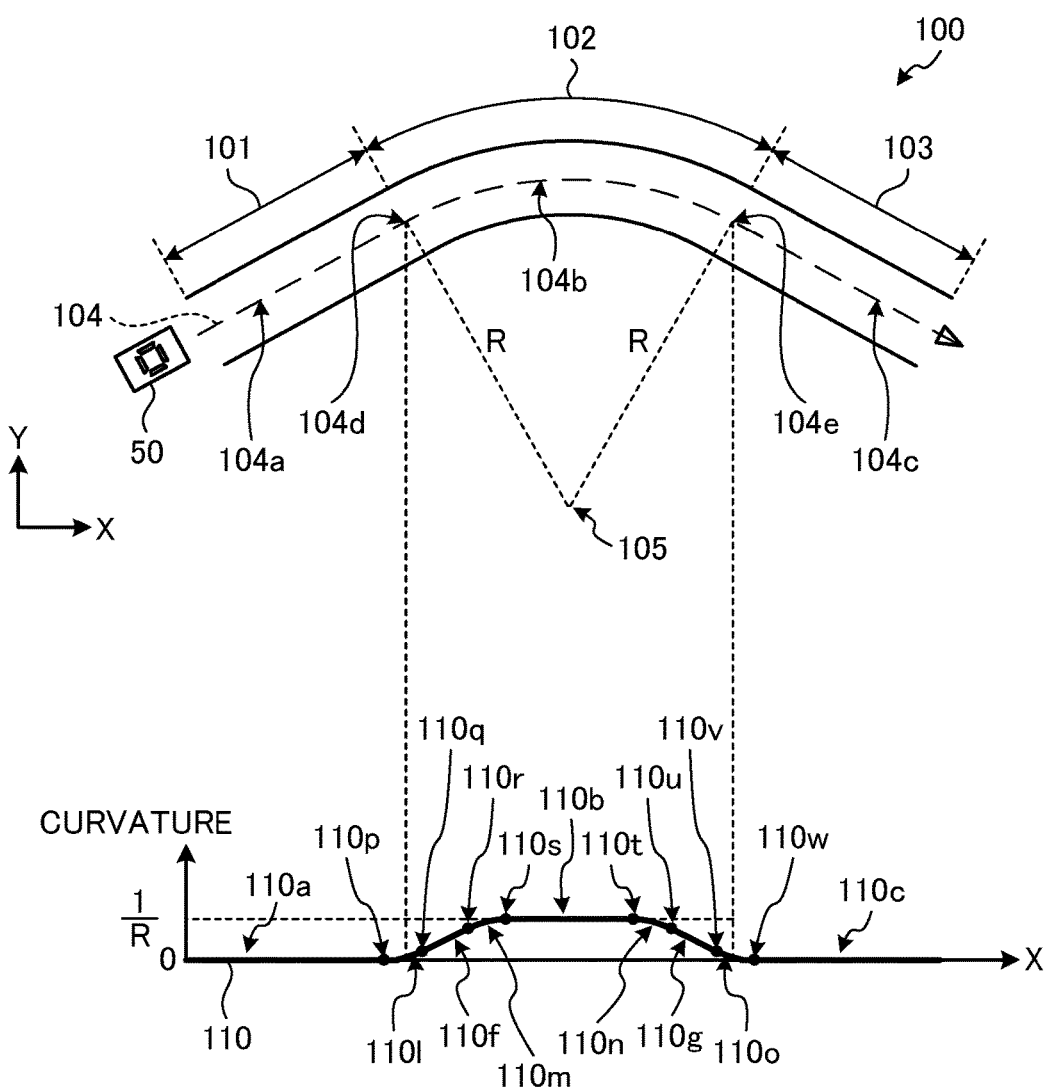
FIG. 7 is a view illustrating an example of a waveform created by the driving assistance device according to the first embodiment.

FIG. 7 is a view illustrating an example of a waveform created by the driving assistance device according to the first embodiment. The second changer 44 changes an end of the first ramp-shaped portion 110*f* toward the start point 110*h* to the first curve portion 110*l*. In the first embodiment, the second changer 44 provides the first curve portion 110*l* that is a quadric curve whose tangent at a point 110*p* rearward in the traveling direction coincides with the first portion 110*a* and whose tangent at a point 110*q* forward in the traveling direction coincides with the first ramp-shaped portion 110*f*. Thus, the first curve portion 110*l* extends across the first edge portion 110*d*.

The second changer 44 changes an end of the first ramp-shaped portion 110*f* toward the end point 110*i* to the second curve portion 110*m*. In the first embodiment, the second changer 44 provides the second curve portion 110*m* that is a quadric curve whose tangent at a point 110*r* rearward in the traveling direction coincides with the first ramp-shaped portion 110*f* and whose tangent at a point 110*s* forward in the traveling direction coincides with the second portion 110*b*.

The second changer 44 changes an end of the second ramp-shaped portion 110*g* toward the start point 110*k* to the third curve portion 110*n*. In the first embodiment, the second changer 44 provides the third curve portion 110*n* that is a quadric curve whose tangent at a point 110*t* rearward in the traveling direction coincides with the second portion 110*b* and whose tangent at a point 110*u* forward in the traveling direction coincides with the second ramp-shaped portion 110*g*.

The second changer 44 changes an end of the second ramp-shaped portion 110*g* toward the end point 110*j* to the fourth curve portion 110*o*. In the first embodiment, the second changer 44 provides the fourth curve portion 110*o* that is a quadric curve whose tangent at the point 110*v* rearward in the traveling direction coincides with the second ramp-shaped portion 110*g* and whose tangent at the point 110*w* forward in the traveling direction coincides with the third portion 110*c*. Thus, the fourth curve portion 110*o* extends across the second edge portion 110*e*.

In the first embodiment, a portion from the point 110*p* to the point 110*s* and a portion from the point 110*t* to the point 110*w* will be referred to as "roll jerk curves."

Figure 8:
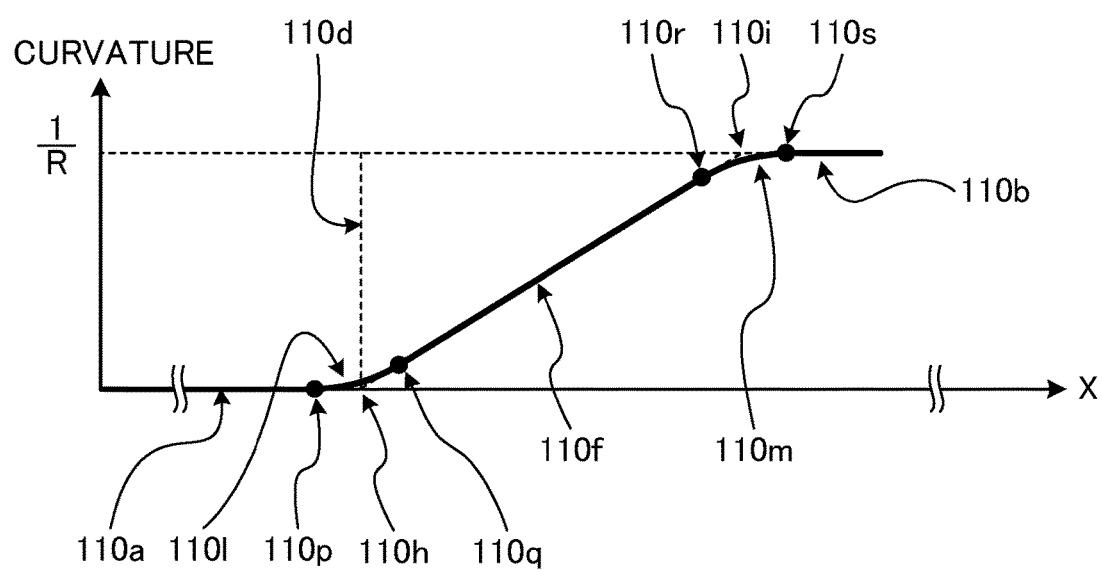
FIG. 8 is a partially enlarged view illustrating an example of a waveform created by the driving assistance device according to the first embodiment.

FIG. 8 is a partially enlarged view illustrating an example of a waveform created by the driving assistance device according to the first embodiment. FIG. 8 is an enlarged graph of the first ramp-shaped portion 110*f* and the vicinity thereof illustrated in FIG. 7.

The second changer 44 changes an end of the first ramp-shaped portion 110*f* toward the start point 110*h* to the first curve portion 110*l*. In the first embodiment, the second changer 44 provides the first curve portion 110*l* that is a quadric curve whose tangent at the point 110*p* rearward in the traveling direction coincides with the first portion 110*a* and whose tangent at the point 110*q* forward in the traveling direction coincides with the first ramp-shaped portion 110*f*. Thus, the first curve portion 110*l* extends across the first edge portion 110*d*.

The second changer 44 changes an end of the first ramp-shaped portion 110*f* toward the end point 110*i* to the second curve portion 110*m*. In the first embodiment, the second changer 44 provides the second curve portion 110*m* that is a quadric curve whose tangent at the point 110*r* rearward in the traveling direction coincides with the first ramp-shaped portion 110*f* and whose tangent at the point 110*s* forward in the traveling direction coincides with the second portion 110*b*.

In the first embodiment, the first curve portion 110*l*, the second curve portion 110*m*, the third curve portion 110*n*, and the fourth curve portion 110*o* are quadric curves, but the present invention is not limited to this example. As another example, the first curve portion 110*l*, the second curve portion 110*m*, the third curve portion 110*n*, and the fourth curve portion 110*o* may be three or higher-order curves or exponential curves.

With reference to FIG. 3 again, in step S108, the travel track creator 45 creates a travel track 120 based on the waveform 110.

Figure 9:
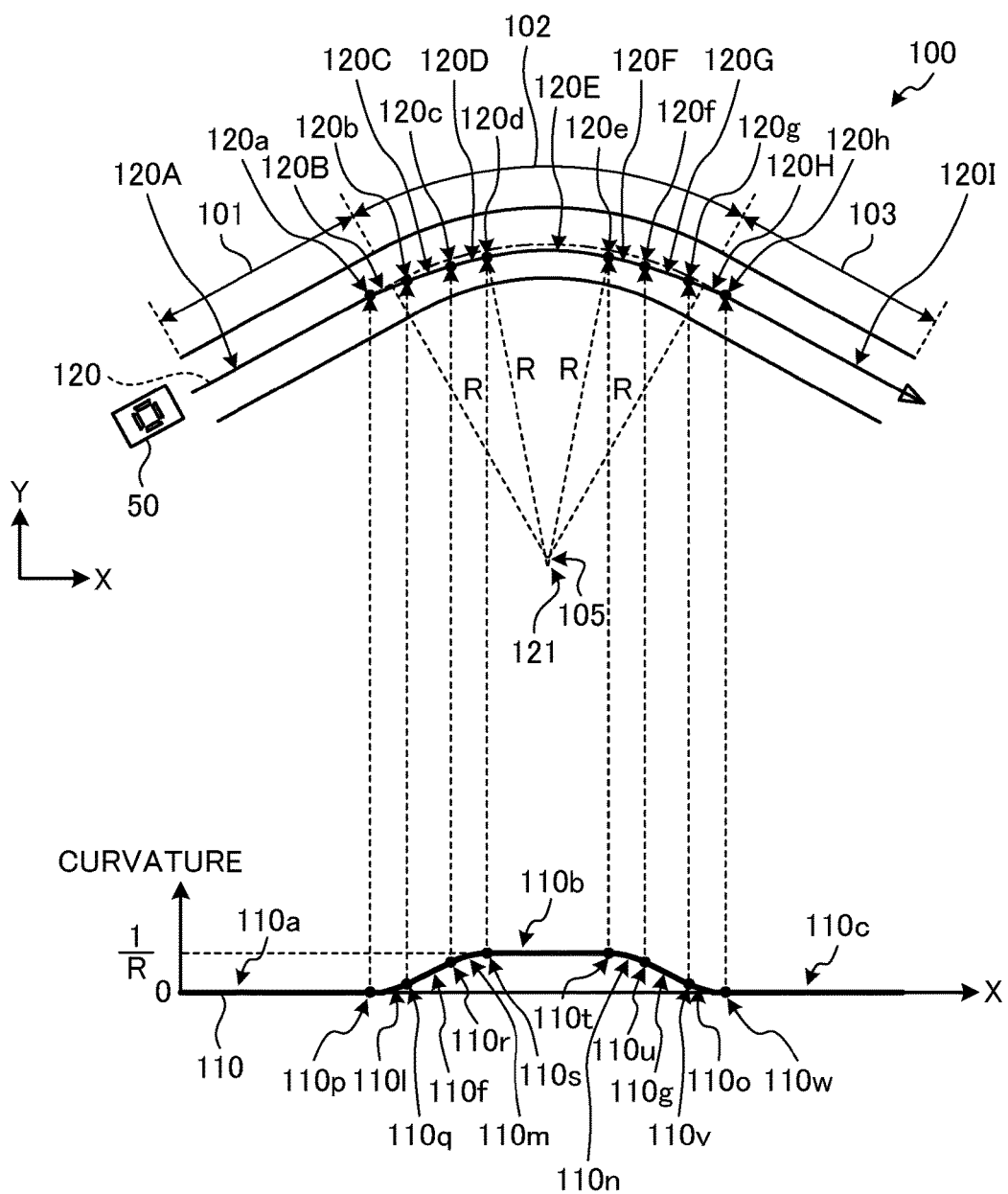
FIG. 9 is a view illustrating an example of a travel track created by the driving assistance device according to the first embodiment.

FIG. 9 is a view illustrating an example of a travel track created by the driving assistance device according to the first embodiment. The travel track creator 45 scans the waveform 110 at regular intervals and plots a point based on a curvature at each scanning point on the road 100, thereby creating the travel track 120.

No change is made from an origin O to the point 110*p* of the waveform 110. Thus, the travel track creator 45 creates a straight track 120A along the inlet straight track 104*a* until a point 120*a* having the same X coordinate as that of the point 110*p*.

A portion of the waveform 110 from the point 110*p* to the point 110*q* is changed to the first curve portion 110*l* that is a quadric curve. Thus, the travel track creator 45 creates a track 120B having a curvature of a quadric curve from a point 120*a* having the same X coordinate as that of the point 110*p* to a point 120*b* having the same X coordinate as that of the point 110*q*.

The point 120*a* is located rearward of the boundary between the inlet straight portion 101 and the arc portion 102 in the traveling direction. Thus, the travel track 120 starts bending from a rearward point in the traveling direction as compared to the reference travel track 104.

A portion from the point 110*q* to the point 110*r* of the waveform 110 is changed to the first ramp-shaped portion 110*f*. Thus, the travel track creator 45 creates a track 120C having a curvature of a ramp shape from the point 120*b* having the same X coordinate as that of the point 110*q* to a point 120*c* having the same X coordinate as that of the point 110*r*. A curve having a curvature of a ramp shape is a clothoid curve. Thus, the track 120C is a clothoid curve.

A portion of the waveform 110 from the point 110*r* to the point 110*s* is changed to the second curve portion 110*m* that is a quadric curve. Thus, the travel track creator 45 creates a track 120D having a curvature of a quadric curve from the point 120c having the same X coordinate as that of the point 110r to a point 120d having the same X coordinate as that of the point 110s.

No change is made from the point 110s to the point 110t of the waveform 110. Thus, in a manner similar to the arc track 104b, the travel track creator 45 creates an arc track 120E from the point 120d having the same X coordinate as that of the point 110s to a point 120e having the same X coordinate as that of the point 110t. Since the track 120B starts bending at a rearward point in the traveling direction as compared to the reference travel track 104, a point 121 as the center of the track 120E is located farther from the road 100 than a point 105 as the center of the arc track 104b.

A portion of the waveform 110 from the point 110t to the point 110u is changed to the third curve portion 110n that is a quadric curve. Thus, the travel track creator 45 creates a track 120F having a curvature of a quadric curve from the point 120e having the same X coordinate as that of the point 110t to a point 120f having the same X coordinate as that of the point 110u.

A portion of the waveform 110 from the point 110u to the point 110v is changed to the second ramp-shaped portion 110g. Thus, the travel track creator 45 creates a track 120G having a curvature of a ramp shape from the point 120f having the same X coordinate as that of the point 110u to a point 120g having the same X coordinate as that of the point 110v. A curve having a curvature of a ramp shape is a clothoid curve. Thus, the track 120G is a clothoid curve.

A portion of the waveform 110 from the point 110v to the point 110w is changed to the fourth curve portion 110o that is a quadric curve. Thus, the travel track creator 45 creates a track 120H having a curvature of a quadric curve from the point 120g having the same X coordinate as that of the point 110v to a point 120h having the same X coordinate as that of the point 110w.

The point 120h is located forward of a connection portion between the arc portion 102 and the outlet straight portion 103 in the traveling direction. Thus, the travel track 120 continues to bend forward in the traveling direction as compared to the reference travel track 104.

No change is made on a portion of the waveform 110 from the point 110w forward in the traveling direction. Thus, the travel track creator 45 creates a straight track 120I along the outlet straight track 104c from the point 120h having the same X coordinate as that of the point 110w forward in the traveling direction.

The travel track 120 is constituted by the tracks 120A, 120B, 120C, 120D, 120E, 120F, 120G, 120H, and 120I.

In the first embodiment, a portion from the point 120a to the point 120d and a portion from the point 120e to the point 120h will be referred to as "roll jerk travel tracks."

A lateral acceleration of the vehicle 50 is direct proportional to a curvature. That is, the waveform 110 representing a curvature of the travel track 120 is also a waveform representing a lateral acceleration of the vehicle 50 travelling on the travel track 120. The waveform 110 smoothly increases from the point 110p to the point 110s and smoothly decreases from the point 110t to the point 110w. Thus, the lateral acceleration of the vehicle 50 traveling on the travel track 120 smoothly changes. That is, the driving assistance device 1 can create the travel track 120 on which the vehicle 50 can travel smoothly. In this manner, the driving assistance device 1 can reduce the possibility of side-slip of the vehicle 50 and can reduce uncomfort of a passenger.

With reference to FIG. 3 again, in step S110, the travel track displayer 46 overlays the travel track 120 on a map and displays the resulting map on the display 24. In the case of not performing an automatic operation of the vehicle 50, a user operates steering so that the vehicle 50 travels on the travel track 120 displayed on the display 24. In this manner, the lateral acceleration of the vehicle 50 smoothly changes. Accordingly, occurrence of side-slip of the vehicle 50 can be reduced, and uncomfort of a passenger can be reduced.

In step S112, the actuator controller 47 determines whether the auto-drive flag 22b is "1" or not. If the actuator controller 47 determines that the auto-drive flag 22b is "1" (Yes), the process proceeds to step S114, whereas if the actuator controller 47 determines that the auto-drive flag 22b is "0" (No), the process is terminated.

In step S114, the actuator controller 47 operates the actuator 25 to thereby cause the steering column 51 to rotate so that the vehicle 50 travels on the travel track 120, and the process is terminated. In this manner, the lateral acceleration of the vehicle 50 smoothly changes. That is, the driving assistance device 1 enables the vehicle 50 to travel smoothly. In this manner, the driving assistance device 1 can reduce the possibility of side-slip of the vehicle 50 and can reduce uncomfort of a passenger.

FIG. 10 is a view illustrating a waveform of second-order differentiation of a curvature of the travel track according to the first embodiment. The curvature of the travel track 120 is direct proportional to the lateral acceleration of the vehicle 50. A first-order differentiation of the curvature of the travel track 120 is direct proportional to a lateral jerk of the vehicle 50. A second-order differentiation of the curvature of the travel track 120 is direct proportional to a change rate of a lateral jerk of the vehicle 50.

As illustrated in FIG. 10, the curvature of the waveform 110 from the origin O to the point 110p is 0 (zero). Thus, a portion 130a of a waveform 130 of second-order differentiation of the curvature in the travel track 120 corresponding to the portion from the origin O to the point 110p is 0 (zero).

A portion of the waveform 110 from the point 110p to the point 110q is a quadric curve. Thus, a portion 130b of the waveform 130 from a point corresponding to the point 110p to a point corresponding to the point 110q is a positive constant.

A portion of the waveform 110 from the point 110q to the point 110r has a ramp shape. Thus, a portion 130c of the waveform 130 from a point corresponding to the point 110q to a point corresponding to the point 110r is 0 (zero).

A portion of the waveform 110 from the point 110r to the point 110s is a quadric curve. Thus, a portion 130d of the waveform 130 from a point corresponding to the point 110r to a point corresponding to the point 110s is a negative constant.

A portion of the waveform 110 from the point 110s to the point 110t is a positive constant. Thus, a portion 130e of the waveform 130 from a point corresponding to the point 110s to a point corresponding to the point 110t is 0 (zero).

A portion of the waveform 110 from the point 110t to the point 110u is a quadric curve. Thus, a portion 130f of the waveform 130 from a point corresponding to the point 110t to a point corresponding to the point 110u is a negative constant.

A portion of the waveform 110 from the point 110u to the point 110v has a ramp shape. Thus, a portion 130g of the waveform 130 from a point corresponding to the point 110u to a point corresponding to the point 110v is 0 (zero).

A portion of the waveform 110 from the point 110v to the point 110w is a quadric curve. Thus, a portion 130h of the waveform 130 from a point corresponding to the point 110v to a point corresponding to the point 110w is a positive constant.

A portion of the waveform 110 from the point 110w is 0 (zero). Thus, a portion 130i of the waveform 130 from a point corresponding to the point 110w is 0 (zero).

As described above, the driving assistance device 1 can create the travel track 120 on which the lateral acceleration of the vehicle 50 smoothly changes. That is, the driving assistance device 1 can create the travel track 120 on which the vehicle 50 can travel smoothly. In this manner, the driving assistance device 1 can reduce occurrence of side-slip of the vehicle 50 and can reduce uncomfort of a passenger.

The driving assistance device 1 can also create the travel track 120 from the reference travel track 104 that is a single-line road (polyline) in the map data 22a.

The driving assistance device 1 operates the actuator 25 to thereby the steering column 51 to rotate so that the vehicle 50 travels on the travel track 120. In a typical driving assistance device, to reduce the possibility of side-slip of the vehicle 50 and reduce uncomfort of a passenger, it is necessary to perform feedback control that detects a traveling state of the vehicle 50 and adjusts the amount of control. On the other hand, the driving assistance device 1 can perform feedforward control so that the vehicle 50 can travel on the travel track 120, and thus, the configuration of the driving assistance device 1 can be simplified and the driving assistance device 1 can be manufactured at low costs.

Second Embodiment

Figure 11:
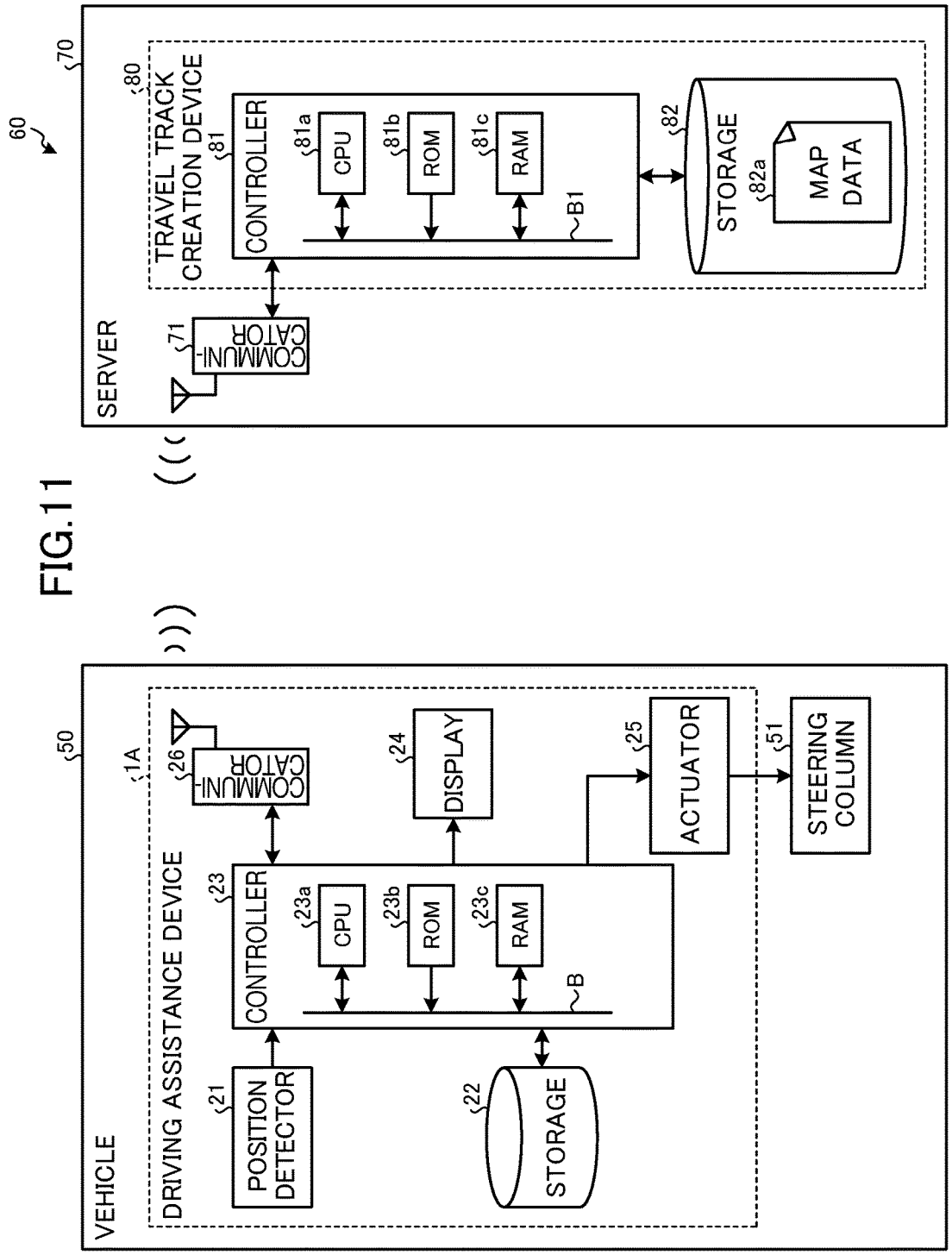
FIG. 11 is a view illustrating a configuration of a driving assistance system according to a second embodiment.

FIG. 11 is a view illustrating a configuration of a driving assistance system according to a second embodiment. Components similar to those described in the first embodiment are denoted by the same reference characters, and description thereof will not be repeated.

A driving assistance system 60 includes a driving assistance device 1A mounted on a vehicle 50 and a server 70.

The driving assistance device 1A further includes a communicator 26 for performing wireless communication with the server 70, in addition to a position detector 21, a storage 22, a controller 23, a display 24, and an actuator 25 that are components of the driving assistance device 1 according to the first embodiment. Examples of the wireless communication include wideband code division multiple access (W-CDMA) and long term evolution (LTE).

The server 70 includes a communicator 71 for performing wireless communication with the driving assistance device 1A and a travel track creation device 80. The travel track creation device 80 includes a controller 81 and a storage 82.

The controller 81 includes a CPU 81a, a ROM 81b, and a RAM 81c. The CPU 81a, the ROM 81b, and the RAM 81c are connected to each other through a bus B1.

The CPU 81a executes a program stored in the ROM 82b while using the RAM 81c as a work area. The program may be stored in the storage 82.

The storage 82 stores map data 82a. Examples of the storage 82 include an SSD or an HDD.

Figure 12:
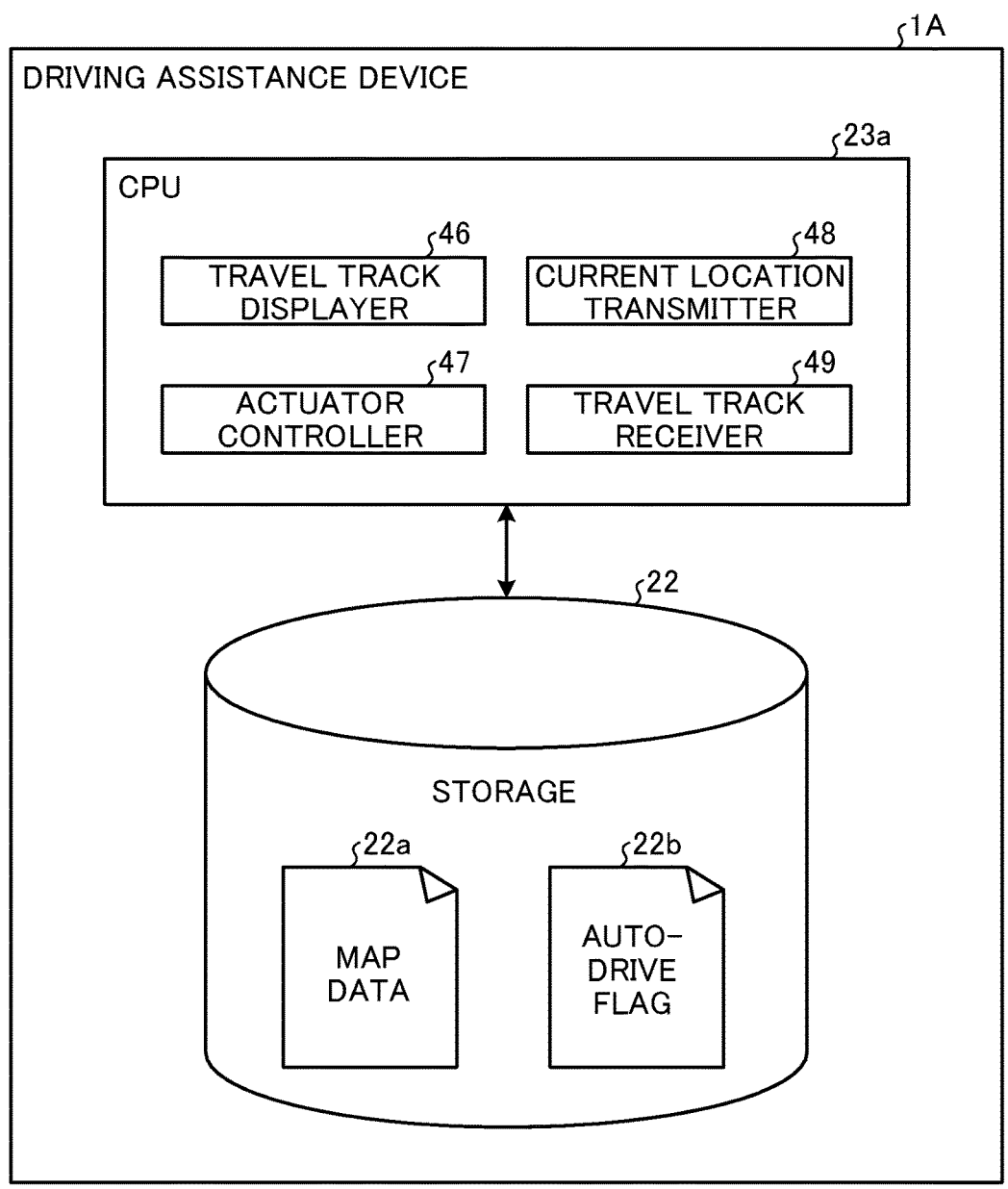
FIG. 12 is a view illustrating functional blocks of a driving assistance device according to the second embodiment.

FIG. 12 is a view illustrating functional blocks of the driving assistance device according to the second embodiment. The CPU 23a executes a program stored in the ROM 23b. In this manner, a travel track displayer 46, an actuator controller 47, a current location transmitter 48, and a travel track receiver 48 are implemented.

The current location transmitter 48 transmits a current location of the vehicle 50 to the server 70.

The travel track receiver 49 receives a travel track from the server 70.

Figure 13:
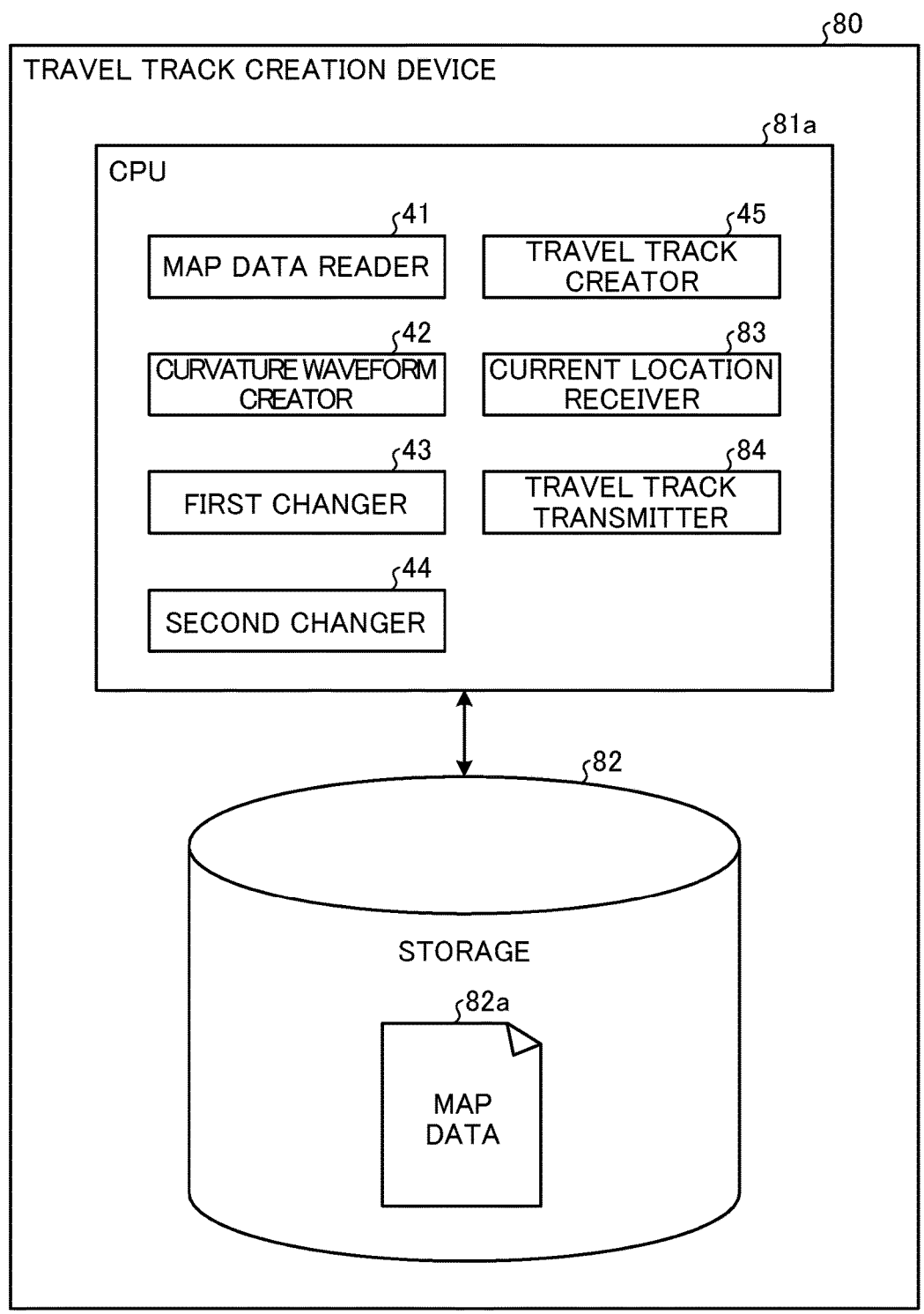
FIG. 13 is a view illustrating functional blocks of a travel track creation device according to the second embodiment.

FIG. 13 is a view illustrating functional blocks of a travel track creation device according to the second embodiment. The CPU 81a executes a program stored in the ROM 81b. In this manner, a map data reader 41, a curvature waveform creator 42, a first changer 43, a second changer 44, a travel track creator 45, a current location receiver 83, and a travel track transmitter 84 are implemented.

The current location receiver 83 receives a current location of the vehicle 50 from the driving assistance device 1A.

The travel track transmitter 84 transmits a travel track to the driving assistance device 1A.

Figure 14:
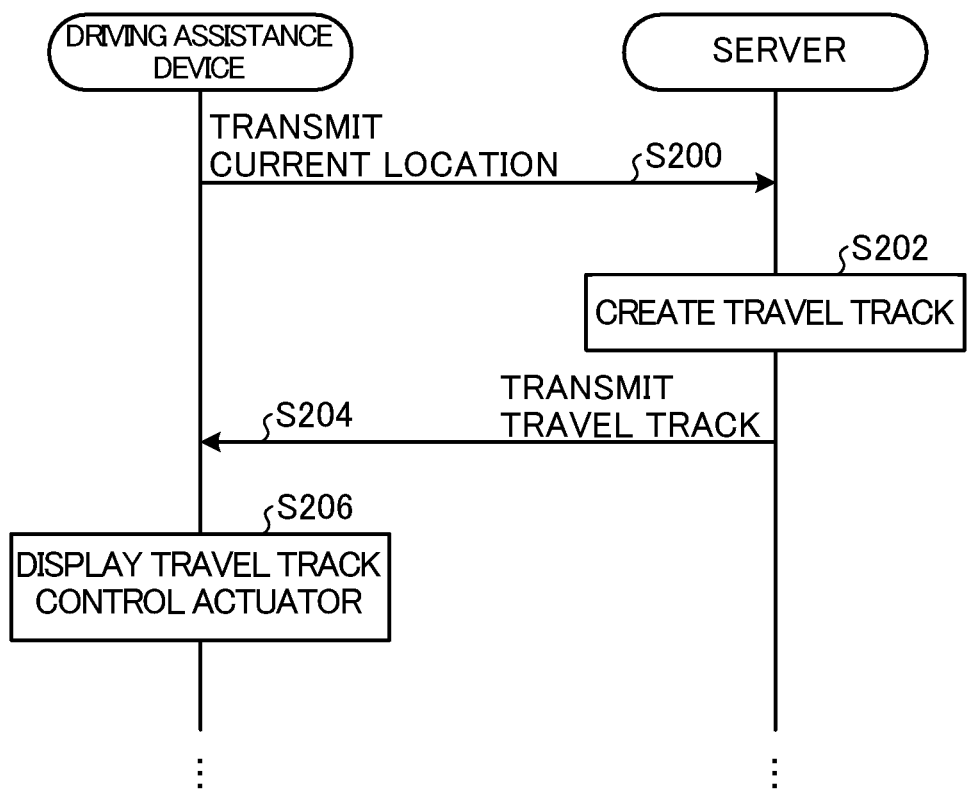
FIG. 14 is a sequence diagram depicting an operation of the driving assistance system according to the second embodiment.

FIG. 14 is a sequence diagram depicting an operation of the driving assistance system according to the second embodiment. The driving assistance device 1A starts processes shown in FIG. 14 when the distance between the vehicle 50 and a curve or an intersection reaches a predetermined distance.

In step S200, the current location transmitter 48 of the driving assistance device 1A transmits data indicating the current location of the vehicle 50 to the server 70. The current location receiver 83 of the server 70 receives the data indicating the current location of the vehicle 50 from the driving assistance device 1A.

In step S202, the map data reader 41, the curvature waveform creator 42, the first changer 43, the second changer 44, and the travel track creator 45 of the server 70 create a travel track on which a lateral acceleration of the vehicle 50 smoothly changes.

The content of step S202 is similar to step S100 through step S108 shown in the flowchart of FIG. 3 of the first embodiment.

In step S204, the travel track transmitter 84 of the server 70 transmits the travel track to the driving assistance device 1A. The travel track receiver 49 of the driving assistance device 1A receives the travel track from the server 70.

In step S206, the travel track displayer 46 of the driving assistance device 1A overlays the travel track on a map and displays the resulting map on the display 24. If the actuator controller 47 of the driving assistance device 1A determines that an auto-drive flag 22b is "1," the actuator controller 47 operates the actuator 25 to thereby cause the steering column 51 to rotate so that the vehicle 50 travels on the travel track in step S206.

The content of step S206 is similar to step S110 through step S114 shown in the flowchart of FIG. 3 of the first embodiment.

In the driving assistance system 60, the travel track can be created in the server 70. Thus, the necessity for creating a travel track in the driving assistance device 1A mounted on the vehicle 50 can be eliminated so that a processing load of the CPU 23a of the driving assistance device 1A can be reduced.

For demands in terms of packaging or reduction of power consumption, the CPU 23a mounted on the vehicle 50 has a low processing capacity in some cases. In the driving assistance system 60, however, a travel track can be created in the server 70. Thus, even with a low processing capacity of the CPU 23a, the driving assistance system 60 can create a travel track on which the vehicle 50 can travel smoothly. In this manner, the driving assistance system 60 can reduce the possibility of side-slip of the vehicle 50 and can reduce uncomfort of a passenger.

Third Embodiment

Figure 15:
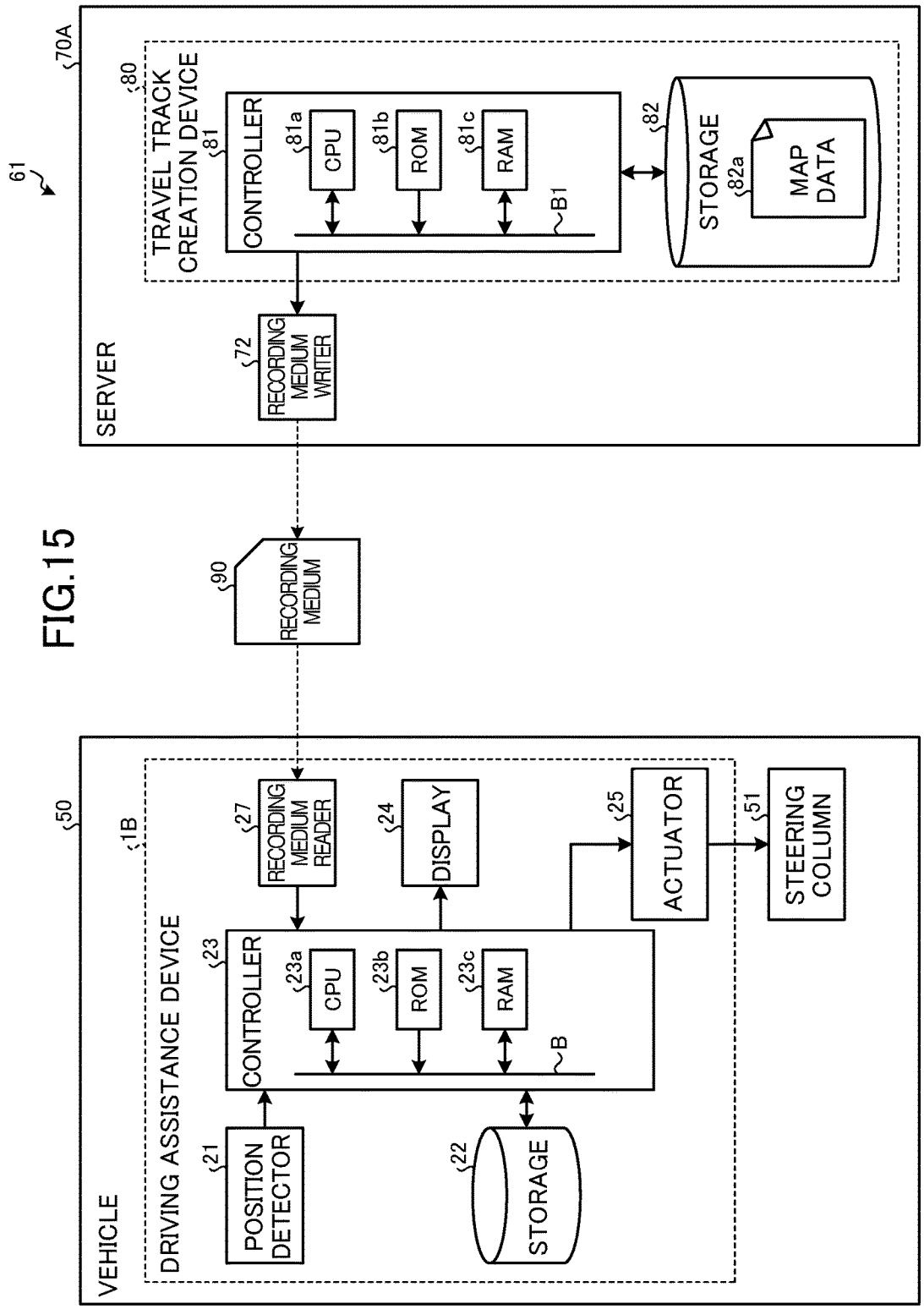
FIG. 15 is a view illustrating a configuration of a driving assistance system according to a third embodiment.

FIG. 15 is a view illustrating a configuration of a driving assistance system according to a third embodiment. Components similar to those described in the first or second embodiment are denoted by the same reference characters, and description thereof will not be repeated.

A driving assistance system 61 includes a driving assistance device 1B mounted on a vehicle 50 and a server 70A.

The driving assistance device 1B further includes a recording medium reader 27 for reading data recorded on a recording medium 90, in addition to a position detector 21, a storage 22, a controller 23, a display 24, and an actuator 25 that are components of the driving assistance device 1 according to the first embodiment.

The server 70A includes a recording medium writer 72 for writing data on the recording medium 90 and a travel track creation device 80.

Examples of the recording medium 90 include an SD card (registered trademark), a universal serial bus (USB) memory, and a digital versatile disc (DVD).

The travel track creation device 80 creates a travel track on which a vehicle can travel smoothly for each curve or intersection in all the regions in Japan and records the travel track on the recording medium 90.

A user of the vehicle 50 brings the recording medium 90 into the vehicle 50 and inserts the recording medium 90 in the recording medium reader 27 of the driving assistance device 1B. In the driving assistance device 1B, a travel track recorded on the recording medium 90 may be installed or copied in the storage 22. In this manner, the user can remove the recording medium 90.

When the distance between the vehicle 50 and a curve or an intersection reaches a predetermined distance, the driving assistance device 1B reads a travel track from the recording medium 90 or the storage 22, overlays the travel track on a map, and displays the resulting map on the display 24. If it is determined that an auto-drive flag 22b is "1," the driving assistance device 1B operates the actuator 25 to thereby cause the steering column 51 to rotate so that the vehicle 50 travels on the travel track.

The driving assistance system 61 can create a travel track in the server 70A. Thus, the necessity for creating a travel track in the driving assistance device 1B mounted on the vehicle 50 can be eliminated so that a processing load of the CPU 23a of the driving assistance device 1B can be reduced.

The driving assistance system 61 can eliminate the necessity for wireless communication, as compared to the driving assistance system 1A according to the second embodiment. As a result, the driving assistance system 61 can reduce manufacturing costs for systems, and can reduce communication costs, that is, running costs.

Fourth Embodiment

A turning angular velocity (yaw angular velocity) r of a vehicle 50 can be expressed by the following Equation (1):

$$r = (V/l)\delta \quad (1)$$

where V is a velocity of the vehicle 50, l is a wheel base of the vehicle 50, and $\delta$ is a steer angle of the vehicle 50.

A turning radius $\rho$ of the vehicle 50 can be expressed by the following Equation (2):

$$\rho = 1/\delta \quad (2)$$

Thus, the turning angular velocity r of the vehicle 50 can be expressed by the following Equation (3):

$$r = V/\rho \quad (3)$$

In an arc portion 102 of a road 100, 1/p is 1/R, that is, a curvature. Thus, the turning angle a of the vehicle 50 can be expressed by the following Equation (4) obtained by integral of Equation (3):

$$a = V/R \cdot t \quad (4)$$

Thus, an area of a region A defined by a waveform 110 of the curvature of a reference travel track 104 and the X axis illustrated in FIG. 5 represents a turning angle in a case where the vehicle 50 travels on the reference travel track 104.

Similarly, an area of a region B defined by the waveform 110 of a curvature of a travel track 120 and the X axis illustrated in FIG. 7 represents a turning angle in the case where the vehicle 50 travels on the travel track 120.

With reference to FIG. 6, the end point 110i of the first ramp-shaped portion 110f is located forward of the first edge portion 110d in the traveling direction. The start point 110k of the second ramp-shaped portion 110g is located rearward of the second edge portion 110e in the traveling direction.

Thus, the area of the region defined by the waveform 110 of the curvature of the travel track 120 and the X axis illustrated in FIG. 7, that is, the turning angle in the case where the vehicle 50 travels on the travel track 120, is smaller than the area of the region defined by the waveform 110 of the curvature of the reference travel track 104 and the X axis illustrated in FIG. 5, that is, the turning angle in the case where the vehicle 50 travels on the reference travel track 104.

That is, in the case where the vehicle 50 travels on the travel track 120, the turning angle is smaller than in the case where the vehicle 50 travels on the reference travel track 104 so that the vehicle 50 travels near a shoulder of the outlet straight portion 103 of the road 100, resulting in the possibility of a failure in assuring safety of the vehicle 50.

In view of the problem described above, in the fourth embodiment, it is possible to prevent the vehicle 50 from traveling near the shoulder of the outlet straight portion 103 of the road 100 so that safety of the vehicle 50 can be assured.

Functional blocks of the travel track creation device according to the fourth embodiment are similar to those of the travel track creation device 2 according to the first embodiment illustrated in FIG. 2, and thus, are not shown.

Figure 16:
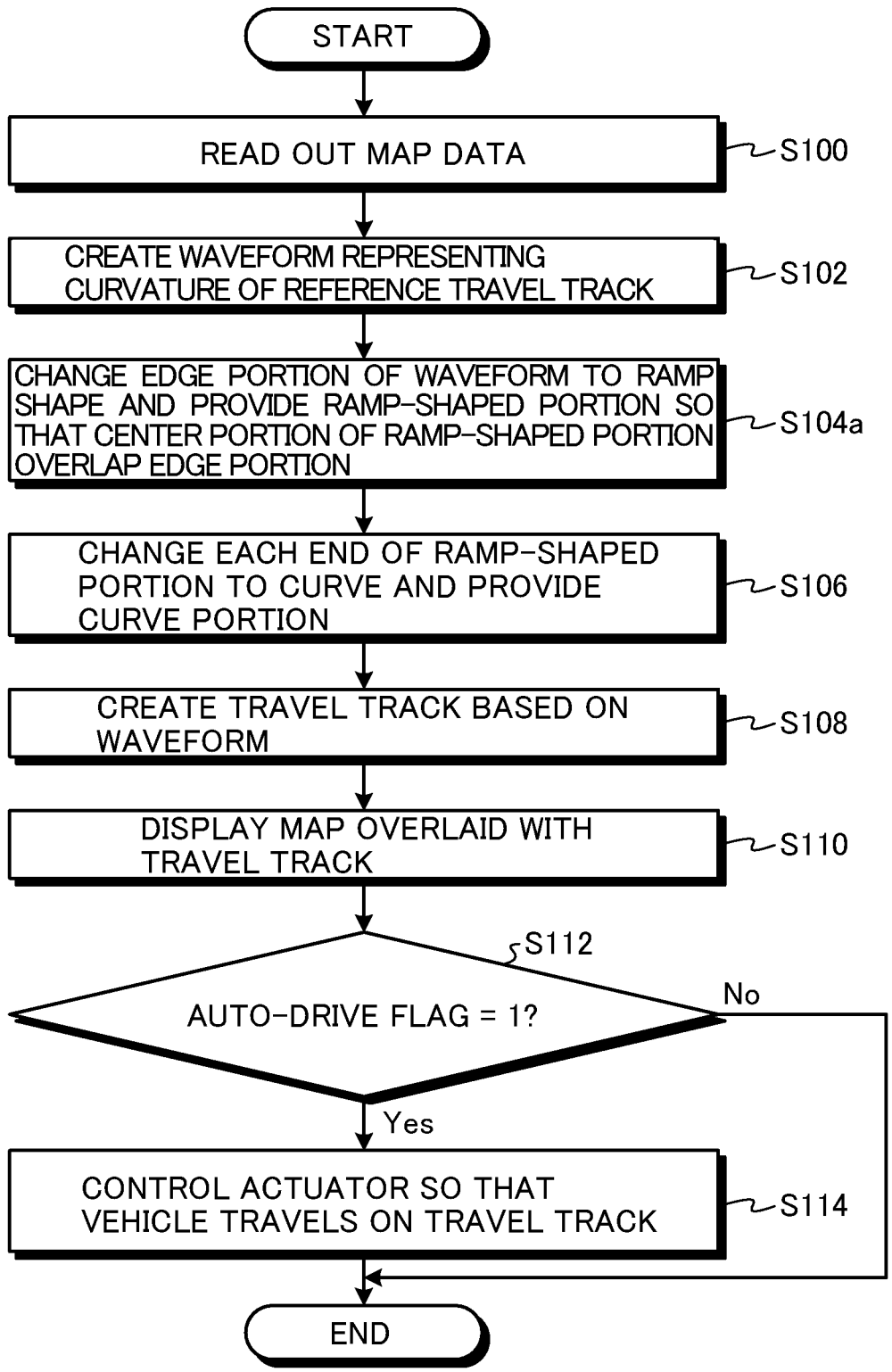
FIG. 16 is a flowchart depicting a process of a driving assistance device according to a fourth embodiment.

FIG. 16 is a flowchart depicting processes of a driving assistance device according to the fourth embodiment. The flowchart depicted in FIG. 16 includes step S104a, instead of step S104 of the flowchart depicted in FIG. 3 according to the first embodiment.

Steps S100 and S102 of the flowchart in FIG. 16 are similar to steps S100 and S102 of the flowchart in FIG. 3 according to the first embodiment, and thus, are not described again.

In step S104a, the first changer 43 changes a first edge portion 110d and a second edge portion 110e of the waveform 110 to a first ramp-shaped portion 110f and a second ramp-shaped portion 110g, respectively, and provides the first ramp-shaped portion 110f and the second ramp-shaped portion 110g in such a manner that an intermediate point 110x of the first ramp-shaped portion 110f overlaps the first edge portion 110d and an intermediate point 110y of the second ramp-shaped portion 110g overlaps the second edge portion 110e.

Figure 17:
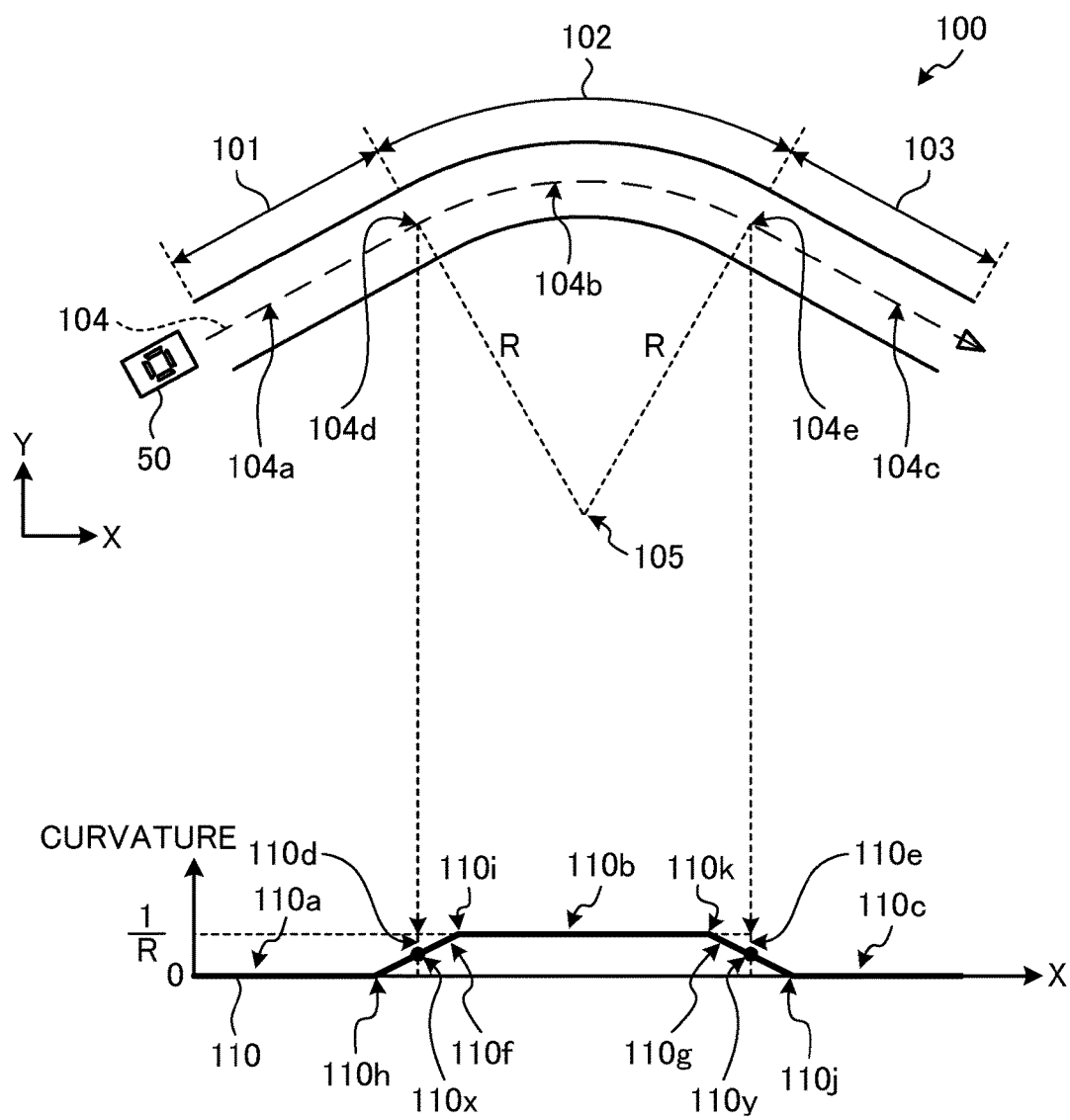
FIG. 17 is a view illustrating an example of a waveform created by the driving assistance device according to the fourth embodiment.

FIG. 17 is a view illustrating an example of a waveform created by the driving assistance device according to the fourth embodiment. The first changer 43 changes the first edge portion 110d of the waveform 110 to a ramp shape, thereby providing the first ramp-shaped portion 110f. In the fourth embodiment, the first changer 43 provides the first ramp-shaped portion 110f in such a manner that the intermediate point 110x of the first ramp-shaped portion 110f overlaps the first edge portion 110d.

The first changer 43 changes the second edge portion 110e of the waveform 110 to a ramp shape, thereby providing the second ramp-shaped portion 110g. In the fourth embodiment, the first changer 43 provides the second ramp-shaped portion 110g in such a manner that the intermediate point 110y of the second ramp-shaped portion 110g overlaps the second edge portion 110e.

With reference to FIG. 16 again, in step S106, the second changer 44 changes each end of each of the first ramp-shaped portion 110f and the second ramp-shaped portion 110g to a curve, thereby providing a first curve portion 110l, a second curve portion 110m, a third curve portion 110n, and a fourth curve portion 110o.

Figure 18:
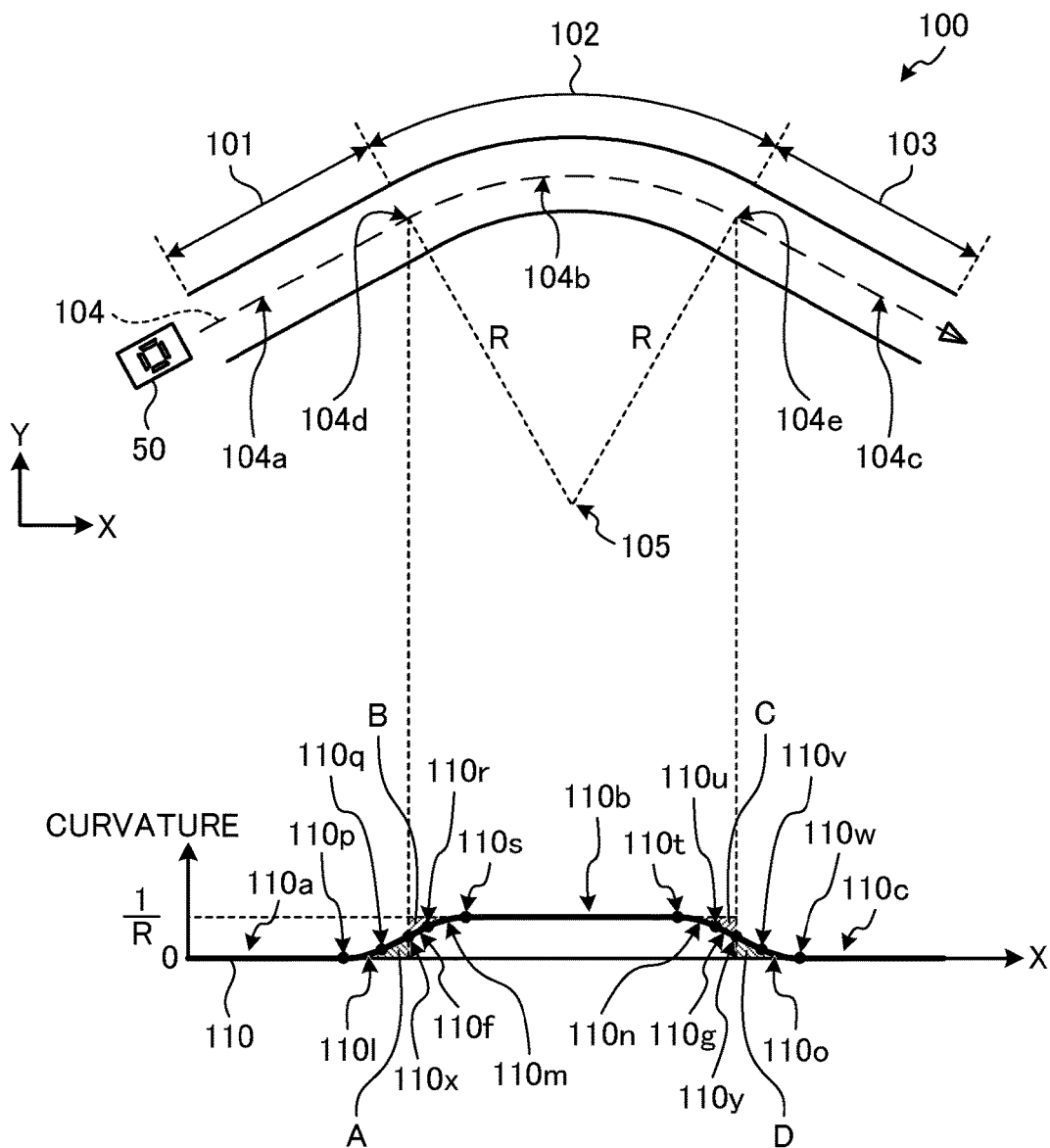
FIG. 18 is a view illustrating an example of a waveform created by the driving assistance device according to the fourth embodiment.

FIG. 18 is a view illustrating an example of the waveform created by the driving assistance device according to the fourth embodiment. The second changer 44 changes an end of the first ramp-shaped portion 110f toward the start point 110h to the first curve portion 110l. In the fourth embodiment, the second changer 44 provides the first curve portion 110l that is a quadric curve whose tangent at a point 110p rearward in the traveling direction coincides with the first portion 110a and whose tangent at a point 110q forward in the traveling direction coincides with the first ramp-shaped portion 110f.

The second changer 44 changes an end of the first ramp-shaped portion 110f toward the end point 110i to the second curve portion 110m. In the fourth embodiment, the second changer 44 provides the second curve portion 110m that is a quadric curve whose tangent at a point 110r rearward in the traveling direction coincides with the first ramp-shaped portion 110f and whose tangent at a point 110s forward in the traveling direction coincides with the second portion 110b.

The second changer 44 changes an end of the second ramp-shaped portion 110g toward the start point 110k to the third curve portion 110n. In the fourth embodiment, the second changer 44 provides the third curve portion 110n that is a quadric curve whose tangent at a point 110t rearward in the traveling direction coincides with the second portion 110b and whose tangent at a point 110u forward in the traveling direction coincides with the second ramp-shaped portion 110g.

The second changer 44 changes an end of the second ramp-shaped portion 110g toward the end point 110j to the fourth curve portion 110o. In the fourth embodiment, the second changer 44 provides the fourth curve portion 110o that is a quadric curve whose tangent at the point 110v rearward in the traveling direction coincides with the second ramp-shaped portion 110g and whose tangent at a point 110w forward in the traveling direction coincides with the third portion 110c.

Steps S108 through S114 in the flowchart depicted in FIG. 16 are the same as steps S108 through S114 in the flowchart depicted in FIG. 3 according to the first embodiment, and will not be described again.

With reference to FIG. 18, an intermediate point 110x of the first ramp-shaped portion 110f overlaps the first edge portion 110d. Thus, an area of a region A defined by the X axis, the first edge portion 110d, and the waveform 110 is equal to an area of a region B defined by a straight line of 1/R, the first edge portion 110d, and the waveform 110.

An intermediate point 110y of the second ramp-shaped portion 110g overlaps the second edge portion 110e. Thus, an area of a region C defined by a straight line of 1/R, the second edge portion 110e, and the waveform 110 is equal to an area of a region D defined by the X axis, the second edge portion 110e, and the waveform 110.

Accordingly, the area of the region defined by the waveform 110 and the X axis illustrated in FIG. 18, that is, the turning angle in a case where the vehicle 50 travels on the travel track 120, is equal to the area of a region defined by the waveform 110 and the X axis illustrated in FIG. 5, that is, the turning angle in a case where the vehicle 50 travels on the reference travel track 104.

In this manner, the driving assistance device according to the fourth embodiment can reduce traveling of the vehicle 50 near a shoulder of the outlet straight portion 103 of the road 100 so that safety of the vehicle 50 can be assured.

Fifth Embodiment

In the first through fourth embodiments, the first curve portion 110l, the second curve portion 110m, the third curve portion 110n, and the fourth curve portion 110o are exemplified by quadric curves, three or more-order curves, or exponential curves. In the present invention, however, the first curve portion 110l, the second curve portion 110m, the third curve portion 110n, and the fourth curve portion 110o are not limited to these examples.

In a fifth embodiment, description will be given on a case where the first curve portion 110l, the second curve portion 110m, the third curve portion 110n, and the fourth curve portion 110o are hyperbolic tangent function (tan h) curves.

Functional blocks of the travel track creation device according to the fifth embodiment are similar to those of the travel track creation device 2 according to the first embodiment illustrated in FIG. 2, and thus, are not shown.

A flowchart showing processes of a travel track creation device according to the fifth embodiment is similar to the flowchart of FIG. 16 according to the fourth embodiment, and thus, is not shown.

In step S104a, the first changer 43 changes a first edge portion 110d and a second edge portion 110e of the waveform 110 to a first ramp-shaped portion 110f and a second ramp-shaped portion 110g, respectively, and provides the first ramp-shaped portion 110f and the second ramp-shaped portion 110g in such a manner that an intermediate point 110x of the first ramp-shaped portion 110f overlaps the first edge portion 110d and an intermediate point 110y of the second ramp-shaped portion 110g overlaps the second edge portion 110e.

Figure 19:
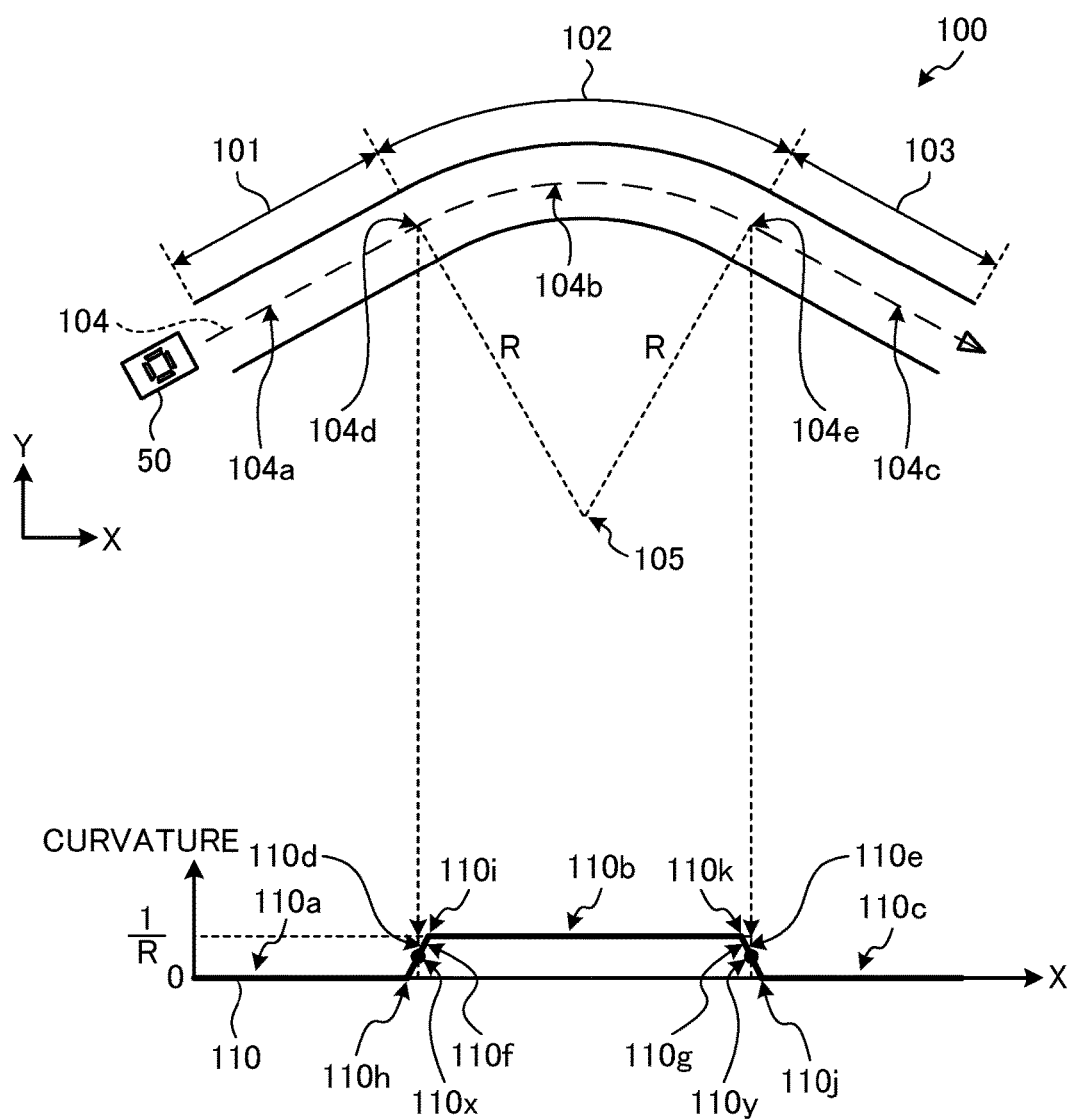
FIG. 19 is a view illustrating an example of a waveform created by a driving assistance device according to a fifth embodiment.

FIG. 19 is a view illustrating an example of a waveform created by a driving assistance device according to the fifth embodiment. The first changer 43 changes the first edge portion 110d of the waveform 110 to a ramp shape, thereby providing the first ramp-shaped portion 110f. In the fifth embodiment, the first changer 43 provides the first ramp-shaped portion 110f in such a manner that the intermediate point 110x of the first ramp-shaped portion 110f overlaps the first edge portion 110d.

The first changer 43 changes the second edge portion 110e of the waveform 110 to a ramp shape, thereby providing the second ramp-shaped portion 110g. In the fifth embodiment, the first changer 43 provides the second ramp-shaped portion 110g in such a manner that the intermediate point 110y of the second ramp-shaped portion 110g overlaps the second edge portion 110e.

Tilts of the first ramp-shaped portion 110f and the second ramp-shaped portion 110g are not specifically limited, and may be any tilts or predetermined tilts.

In step S106, the second changer 44 changes each end of each of the first ramp-shaped portion 110f and the second ramp-shaped portion 110g to a curve, thereby providing a first curve portion 110l, a second curve portion 110m, a third curve portion 110n, and a fourth curve portion 110o.

Figure 20:
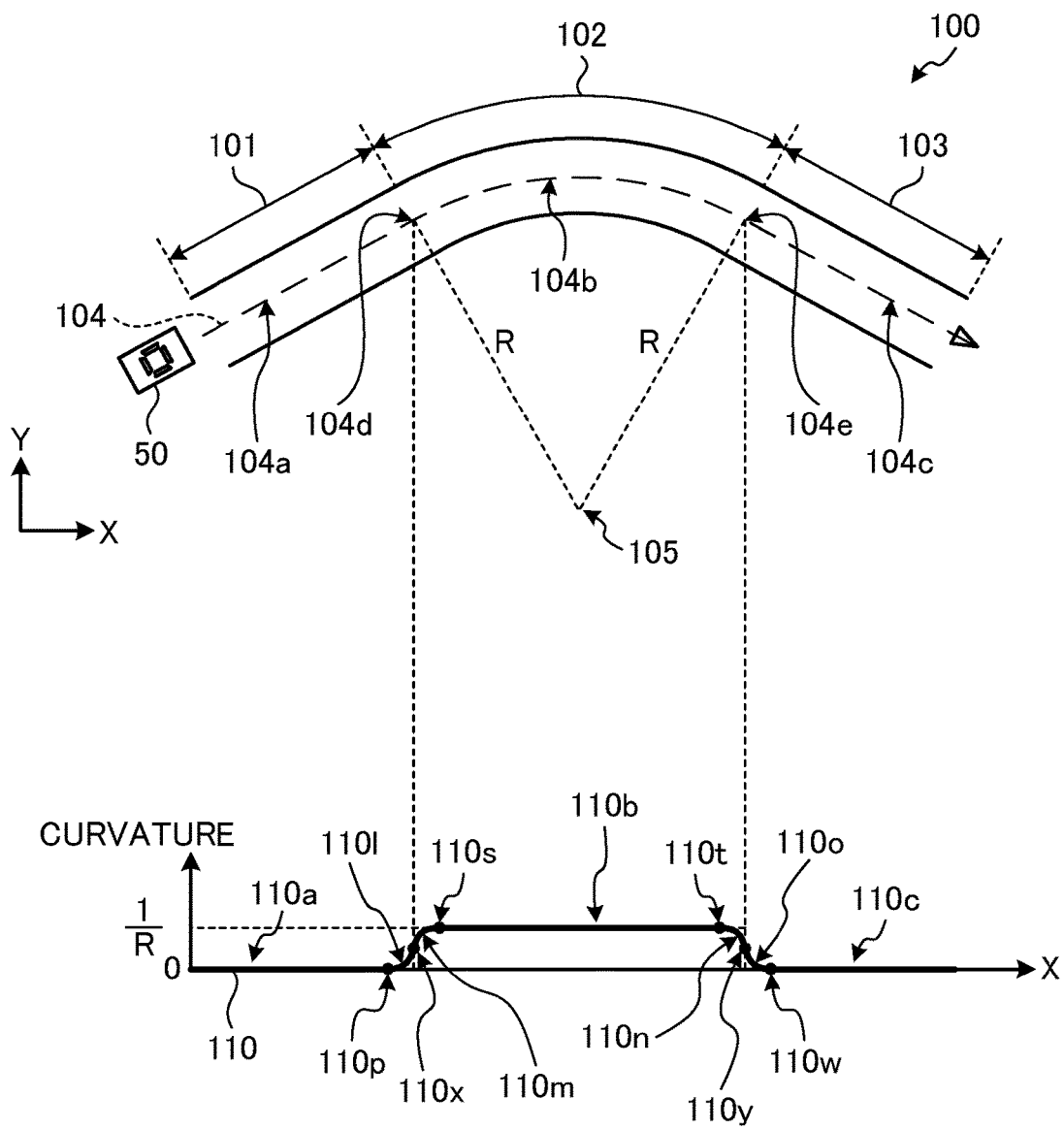
FIG. 20 is a view illustrating an example of a waveform created by the driving assistance device according to the fifth embodiment.

FIG. 20 is a view illustrating an example of the waveform created by the driving assistance device according to the fifth embodiment. The second changer 44 changes an end of the first ramp-shaped portion 110f toward the start point 110h to the first curve portion 110l. In the fifth embodiment, the second changer 44 provides the first curve portion 110l that is a hyperbolic tangent function curve whose tangent at a point 110p rearward in the traveling direction coincides with the first portion 110a and whose tangent at the intermediate point 110x of the first ramp-shaped portion 110f coincides with the first ramp-shaped portion 110f.

The second changer 44 changes an end of the first ramp-shaped portion 110f toward the end point 110i to the second curve portion 110m. In the fifth embodiment, the second changer 44 provides the second curve portion 110m that is a hyperbolic tangent function curve whose tangent at the intermediate point 110x of the first ramp-shaped portion 110f coincides with the first ramp-shaped portion 110f and whose tangent at a point 110s forward in the traveling direction coincides with the second portion 110b.

In the fifth embodiment, the second changer 44 directly couples the first curve portion 110l and the second curve portion 110m at the intermediate point 110x of the first ramp-shaped portion 110f. Thus, the first ramp-shaped portion 110f is eliminated from the waveform 110.

The second changer 44 changes an end of the second ramp-shaped portion 110g toward the start point 110k to the third curve portion 110n. In the fifth embodiment, the second changer 44 provides the third curve portion 110n that is a hyperbolic tangent function curve whose tangent at a point 110t rearward in the traveling direction coincides with the second portion 110b and whose tangent at the intermediate point 110y of the second ramp-shaped portion 110g coincides with the second ramp-shaped portion 110g.

The second changer 44 changes an end of the second ramp-shaped portion 110g toward the end point 110j to the fourth curve portion 110o. In the fifth embodiment, the second changer 44 provides the fourth curve portion 110o that is a hyperbolic tangent function curve whose tangent at the intermediate point 110y of the second ramp-shaped portion 110g coincides with the second ramp-shaped portion 110g and whose tangent at a point 110w forward in the traveling direction coincides with the third portion 110c.

In the fifth embodiment, the second changer 44 directly couples the third curve portion 110n and the fourth curve portion 110o at the intermediate point 110y of the second ramp-shaped portion 110g. Thus, the second ramp-shaped portion 110g is eliminated from the waveform 110.

Figure 21:
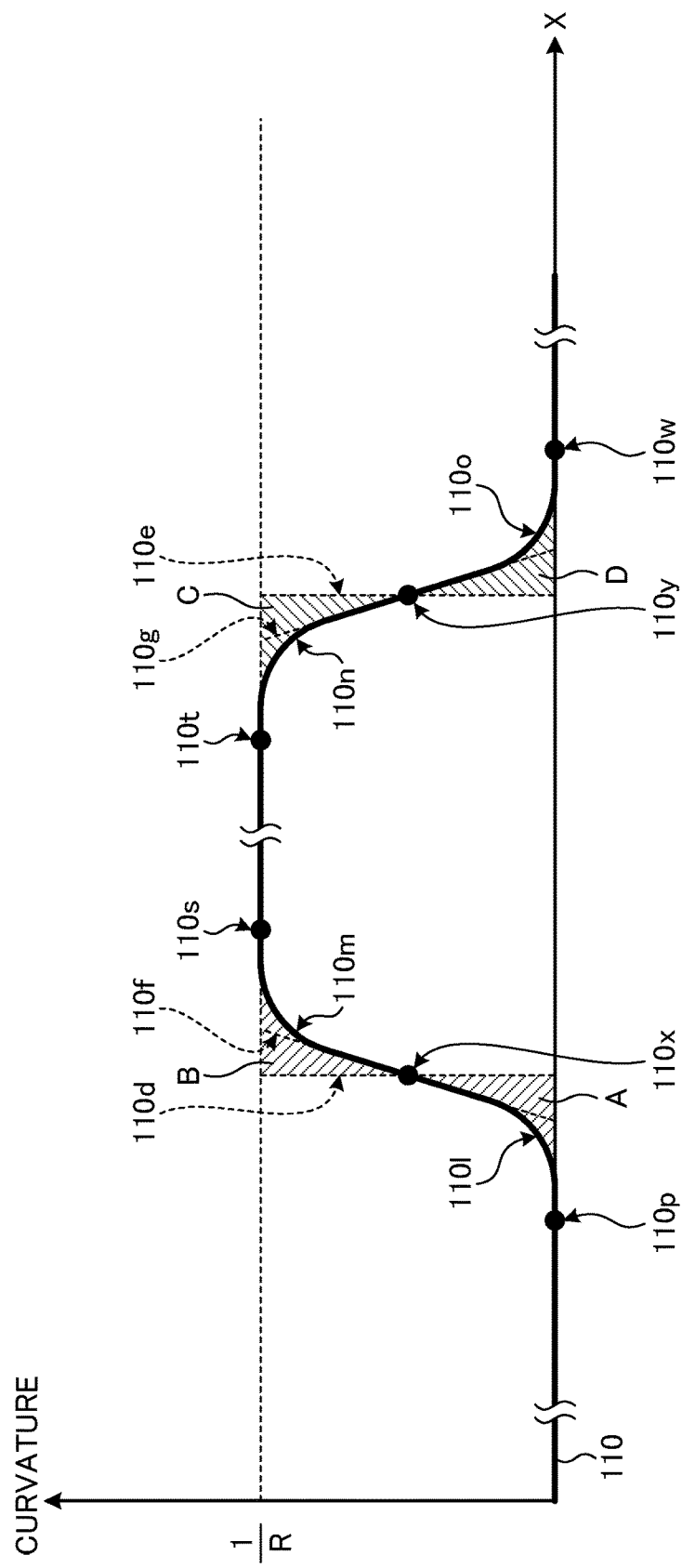
FIG. 21 is a partially enlarged view illustrating an example of a waveform created by the driving assistance device according to the fifth embodiment.

FIG. 21 is a partially enlarged view illustrating an example of the waveform created by the driving assistance device according to the fifth embodiment. FIG. 21 is an enlarged view illustrating the first curve portion 110l, the second curve portion 110m, the third curve portion 110n, and the fourth curve portion 110o and the vicinities thereof illustrated in FIG. 20.

With reference to FIG. 21, an area of a region A defined by the X axis, the first edge portion 110d, and the waveform 110 is equal to an area of a region B defined by a straight line of 1/R, the first edge portion 110d, and the waveform 110. An area of a region C defined by a straight line of 1/R, the second edge portion 110e, and the waveform 110 is equal to an area of a region D defined by the X axis, the second edge portion 110e, and the waveform 110.

Accordingly, the area of the region defined by the waveform 110 and the X axis illustrated in FIG. 20, that is, the turning angle in a case where the vehicle 50 travels on a travel track 120 is equal to the area of a region defined by the waveform 110 and the X axis illustrated in FIG. 5, that is, the turning angle in a case where the vehicle 50 travels on a reference travel track 104.

In this manner, the driving assistance device according to the fifth embodiment can reduce traveling of a vehicle 50 near a shoulder of an outlet straight portion 103 of a road 100 so that safety of the vehicle 50 can be assured.

Figure 22:
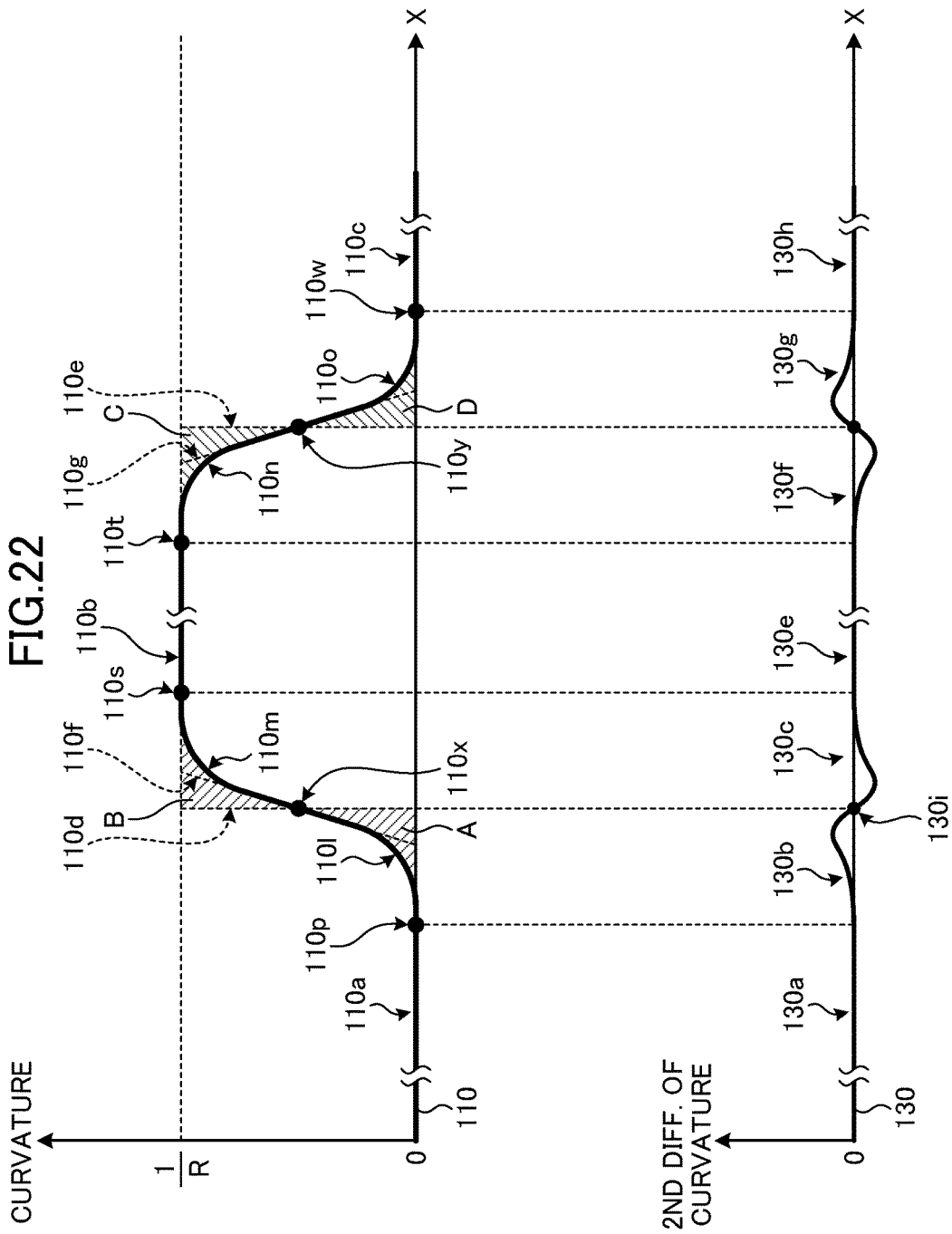
FIG. 22 is a partially enlarged view illustrating a waveform of second-order differentiation of a curvature of a travel track according to the fifth embodiment.
Figure 23:
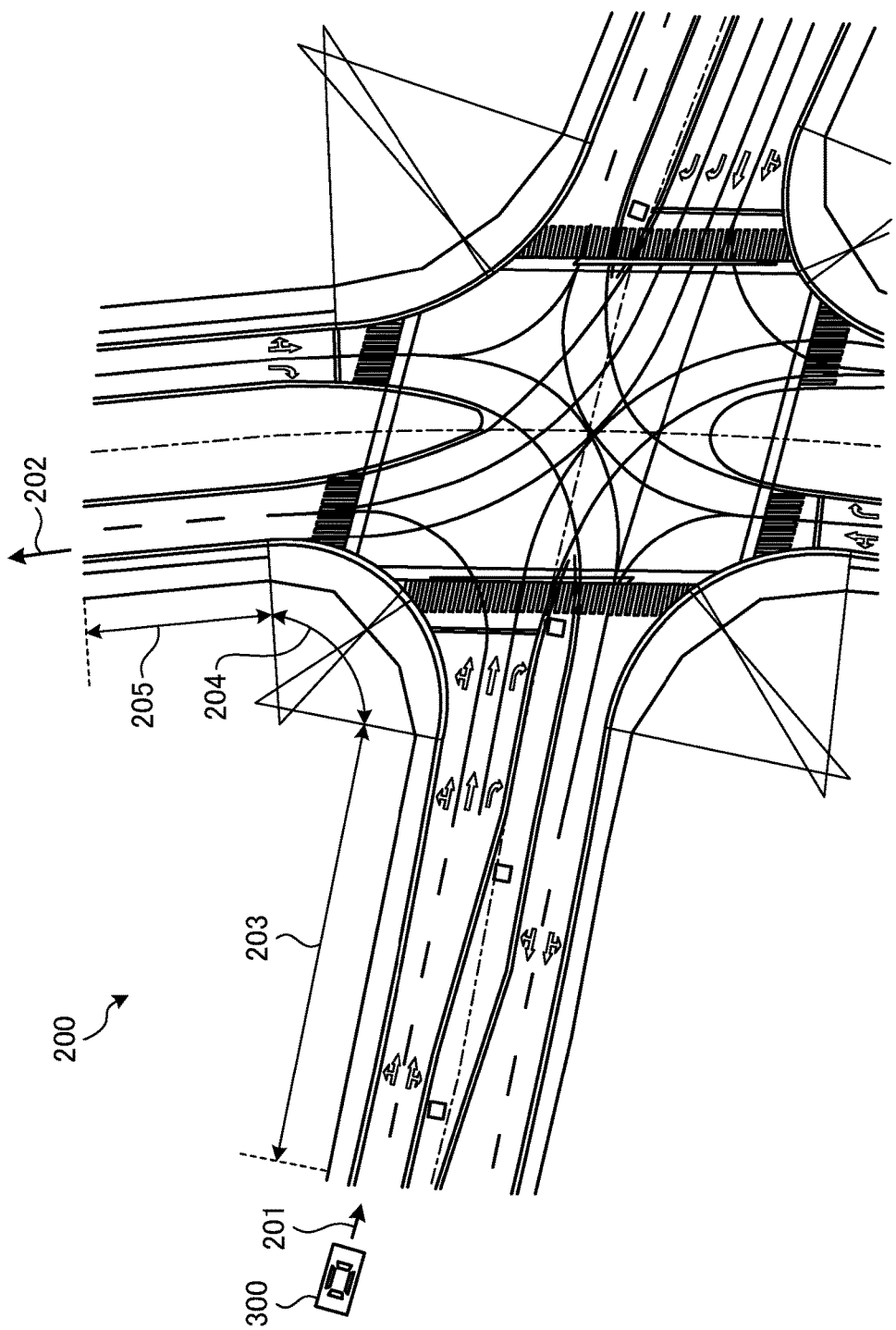
FIG. 23 is a plan view illustrating an example of an intersection.

FIG. 22 is a partially enlarged view of a waveform of second-order differentiation of a curvature of a travel track according to the fifth embodiment. The curvature of the travel track is direct proportional to a lateral acceleration of the vehicle 50. A first-order differentiation of the curvature of the travel track is direct proportional to a lateral jerk of the vehicle 50. A second-order differentiation of the curvature of the travel track is direct proportional to a change rate of a lateral jerk of the vehicle 50.

A hyperbolic tangent function can be expressed by the following Equation (5):

$$y = \tanh(x) \quad (5)$$

The first-order differentiation of Equation (5) can be expressed by the following Equation (6):

$$y' = \operatorname{sech}^2(x) \quad (6)$$

The second-order differentiation of Equation (5) can be expressed by the following Equation (7):

$$y'' = -2\operatorname{sech}^2(x) \cdot \tanh(x) \quad (7)$$

As illustrated in FIG. 22, a portion 110a of the waveform 110 of the curvature from the origin O to the point 110p is 0 (zero). Thus, a portion 130a of the waveform 130 of second-order differentiation of the curvature of the travel track corresponding to the portion 110a is 0 (zero).

The first curve portion 110l of the waveform 110 from the point 110p to the point 110x is a hyperbolic tangent function curve. The second-order differentiation of the hyperbolic tangent function is represented by Equation (7) described above. Thus, a portion 130b of the waveform 130 corresponding to the first curve portion 110l is a curve represented by Equation (7).

The second curve portion 110m of the waveform 110 from the point 110x to the point 110s is a hyperbolic tangent function curve. The second curve portion 110m and the first curve portion 110l are point symmetric with respect to the point 110x. Thus, a portion 130c of the waveform 130 from a point corresponding to the point 110x to a point corresponding to the point 110s and the portion 130c are point symmetric with respect to the point 130i.

A portion 110b of the waveform 110 from the point 110s to the point 110t is a positive constant. Thus, a portion 130e of the waveform 130 to a point corresponding to the point 110b is 0 (zero).

The third curve portion 110n of the waveform 110 from the point 110t to the point 110y is a hyperbolic tangent function curve. The third curve portion 110n and the second curve portion 110m are symmetric with respect to a vertical line as an axis. Thus, a portion 130f of the waveform 130 corresponding to the third curve portion 110n and the portion 130c are line symmetric with respect to a vertical line as an axis.

The fourth curve portion 110o of the waveform 110 from the point 110y to the point 110w is a hyperbolic tangent function curve. The fourth curve portion 110o and the first curve portion 110l are line symmetric with respect to a vertical line as an axis. Thus, a portion 130g of the waveform 130 corresponding to the fourth curve portion 110o and the portion 130b are line symmetric with respect to a vertical line as an axis.

A portion 110c of the waveform 110 from the point 110w is 0 (zero). Thus, a portion 130h of the waveform 130 corresponding to a portion from the point 110w is 0 (zero).

With reference to FIG. 10 described in the first embodiment, in a case where the first curve portion 110l, the second curve portion 110m, the third curve portion 110n, and the fourth curve portion 110o are quadric curves, the waveform 130 of second-order differentiation of the curvature has an edge portion. In the edge portion, a lateral jerk of the vehicle 50 rapidly changes, resulting in the possibilities of side-slip of the vehicle 50 and uncomfort of a passenger.

On the other hand, in the fifth embodiment, the waveform 130 smoothly changes in all the sections, as illustrated in FIG. 22. More specifically, the waveform 130 smoothly changes in an initial portion of the portion 130b, a connection portion between the portion 130b and the portion 130c, an end portion of the portion 130c, an initial portion of the portion 130f, a connection portion between the portion 130f and the portion 130g, and an end portion of the portion 130g.

Thus, the travel track creation device 2 can create a travel track on which a change rate of lateral jerk of the vehicle 50 smoothly changes. That is, the travel track creation device 2 can create the travel track on which the vehicle 50 can travel smoothly. In this manner, the travel track creation device 2 can reduce occurrence of side-slip of the vehicle 50 and can reduce uncomfort of a passenger.

In the fifth embodiment, the first curve portion 110l, the second curve portion 110m, the third curve portion 110n, and the fourth curve portion 110o are hyperbolic tangent function curves, but the present invention is not limited to this example. Other examples of the first curve portion 110l, the second curve portion 110m, the third curve portion 110n, and the fourth curve portion 110o include sigmoid function curves.

The sigmoid function can be expressed by the following Equation (8):

$$y=(\tanh(x/2)+1)/2 \qquad (8)$$

Thus, even in a case where the first curve portion 110l, the second curve portion 110m, the third curve portion 110n, and the fourth curve portion 110o are sigmoid function curves, the travel track creation device 2 can create a travel track on which a change rate of lateral jerk of the vehicle 50 smoothly changes in a manner similar to the case of hyperbolic tangent function curves. That is, the travel track creation device 2 can create the travel track on which the vehicle 50 can travel smoothly. In this manner, the travel track creation device 2 can reduce occurrence of side-slip of the vehicle 50 and can reduce uncomfort of a passenger.

The configurations of the foregoing embodiments are merely examples of the present invention, and may be combined with other known techniques. The configurations may be partially omitted or changed within the range not departing from the gist of the invention.

DESCRIPTION OF REFERENCE CHARACTERS 1, 1A, 1B: driving assistance device, 2, 80: travel track creation device, 21: position detector, 22, 82: storage, 23, 81: controller, 24: display, 25: actuator, 26, 71: communicator, 27: recording medium reader, 41: map data reader, 42: curvature waveform creator, 43: first changer, 44: second changer, 45: travel track creator, 46: travel track displayer, 47: actuator controller, 48: current location transmitter, 49: travel track receiver, 50: vehicle, 60, 61: driving assistance system, 72: recording medium writer, 83: current location receiver, 84: travel track transmitter, and 90: recording medium.

The invention claimed is:

1. A driving assistance system performing steering operation on a vehicle that is traveling on a road which includes an inlet straight portion, an arc portion continuous to the inlet straight portion, and an outlet straight portion continuous to the arc portion, the driving assistance system comprising:
   a travel track creation device and a controller, the travel track creation device including:
   a curvature waveform creator that creates a waveform representing a curvature of a reference travel track that is a track on which the vehicle travels along the road and includes an inlet straight track, an arc track continuous to the inlet straight track, and an outlet straight track continuous to the arc track;
   a first changer that changes each of a first edge portion and a second edge portion to a ramp shape and provides the waveform with a first ramp-shaped portion and a second ramp-shaped portion, the first edge portion and the second edge portion being two edges of the waveform;
   a second changer that changes each end of each of the first ramp-shaped portion and the second ramp-shaped portion to a curve, provides the waveform with a first curve portion, a second curve portion, a third curve portion, and a fourth curve portion, directly couples the first curve portion and the second curve portion to each other, and directly couples the third curve portion and the fourth curve portion to each other; and
   a travel track creator that creates the travel track based on the waveform; and,
   wherein the controller generates a control signal to steer the vehicle according to the travel track.

2. The driving assistance system of claim 1, wherein the first curve portion, the second curve portion, the third curve portion, and the fourth curve portion are quadric curves.

3. The driving assistance system of claim 1, wherein the first curve portion, the second curve portion, the third curve portion, and the fourth curve portion are hyperbolic tangent function curves or sigmoid function curves.

4. The driving assistance system of claim 1, wherein the first changer provides the first ramp-shaped portion and the second ramp-shaped portion in such a manner that intermediate points of the first ramp-shaped portion and the second ramp-shaped portion overlap with the first edge portion and the second edge portion, respectively.

5. The driving assistance system of claim 1, further comprising
   a driving assistance device mounted on the vehicle, wherein
   the driving assistance device includes
   a display that displays an image; and
   a travel track displayer that causes the display to display the travel track.

6. The driving assistance system of claim 1, further comprising
   a driving assistance device mounted on the vehicle, wherein
   the driving assistance device includes an actuator that causes a steering column of the vehicle to rotate; and,
   the controller operates the actuators by the control signal to thereby cause the steering column to rotate so that the vehicle travels on the travel track.

7. The driving assistance system of claim 1, wherein
the travel track creation device further includes a recording medium writer that writes the travel track on a recording medium.

8. The driving assistance system of claim 7, further comprising a driving assistance device mounted on the vehicle, wherein
the driving assistance device includes
a recording medium reader that reads the travel track recorded on the recording medium by the travel track creation device;
a display that displays an image; and
a travel track displayer that causes the display to display the travel track.

9. The driving assistance system of claim 7, further comprising a driving assistance device mounted on the vehicle, wherein
the driving assistance device includes
a recording medium reader that reads the travel track recorded on the recording medium by the travel track creation device; and
an actuator that causes a steering column of the vehicle to rotate; and,
the controller operates the actuator by the control signal to thereby cause the steering column to rotate so that the vehicle travels on the travel track.

10. The driving assistance system of claim 1, further comprising a driving assistance device mounted on the vehicle, wherein
the travel track creation device further includes
a current location receiver that receives a current location of the vehicle from the driving assistance device, and
a travel track transmitter that transmits the travel track to the driving assistance device, and
the driving assistance device includes
a display that displays an image,
a travel track receiver that receives the travel track from the travel track creation device, and
a travel track displayer that causes the display to display the travel track.

11. The driving assistance system of claim 1, further comprising a driving assistance device mounted on the vehicle, wherein
the travel track creation device further includes
a current location receiver that receives a current location of the vehicle from the driving assistance device, and
a travel track transmitter that transmits the travel track to the driving assistance device, and
the driving assistance device includes
an actuator that causes a steering column of the vehicle to rotate; and,
the controller operates the actuator by the control signal to thereby cause the steering column to rotate so that the vehicle travels on the travel track.

12. A driving assistance method for creating a travel track and automatically steering a vehicle that is traveling on a road which includes an inlet straight portion, an arc portion continuous to the inlet straight portion, and an outlet straight portion continuous to the arc portion, the method comprising:
a first step of creating a waveform representing a curvature of a reference travel track that is a track on which the vehicle travels along the road and includes an inlet straight track, an arc track continuous to the inlet straight track, and an outlet straight track continuous to the arc track;
a second step of changing each of a first edge portion and a second edge portion to a ramp shape and providing the waveform with a first ramp-shaped portion and a second ramp-shaped portion, the first edge portion and the second edge portion being two edges of the waveform;
a third step of changing each end of each of the first ramp-shaped portion and the second ramp-shaped portion to a curve, providing the waveform with a first curve portion, a second curve portion, a third curve portion, and a fourth curve portion, directly couples the first curve portion and the second curve portion to each other, and directly couples the third curve portion and the fourth curve portion to each other;
a fourth step of creating the travel track based on the waveform;
a fifth step of generating a control signal to steer the vehicle according to the travel track; and
a sixth step of applying the control signal to a steering actuator.

13. A non-transitory computer-readable medium with instructions stored therein, the instructions, when executed by a data processing system, cause the data processing system to perform a travel track creation method for creating a travel track and automatically steering a vehicle that is traveling on a road which includes an inlet straight portion, an arc portion continuous to the inlet straight portion, and an outlet straight portion continuous to the arc portion, the method comprising:
a first step of creating a waveform representing a curvature of a reference travel track that is a track on which the vehicle travels along the road and includes an inlet straight track, an arc track continuous to the inlet straight track, and an outlet straight track continuous to the arc track;
a second step of changing each of a first edge portion and a second edge portion to a ramp shape and providing the waveform with a first ramp-shaped portion and a second ramp-shaped portion, the first edge portion and the second edge portion being two edges of the waveform;
a third step of changing each end of each of the first ramp-shaped portion and the second ramp-shaped portion to a curve, providing the waveform with a first curve portion, a second curve portion, a third curve portion, and a fourth curve portion, directly couples the first curve portion and the second curve portion to each other, and directly couples the third curve portion and the fourth curve portion to each other;
a fourth step of creating the travel track based on the waveform;
a fifth step of generating a control signal to steer the vehicle according to the travel track; and
a sixth step of applying the control signal to a steering actuator.

* * * * *